United States Patent
Gschwind et al.

(10) Patent No.: US 9,710,382 B2
(45) Date of Patent: *Jul. 18, 2017

(54) HIERARCHICAL TRANSLATION STRUCTURES PROVIDING SEPARATE TRANSLATIONS FOR INSTRUCTION FETCHES AND DATA ACCESSES

(71) Applicant: INTERNATIONAL BUSINESS MACHINES CORPORATION, Armonk, NY (US)

(72) Inventors: Michael K. Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,291

(22) Filed: Sep. 12, 2014

(65) Prior Publication Data

US 2015/0278111 A1    Oct. 1, 2015

Related U.S. Application Data

(63) Continuation of application No. 14/231,665, filed on Mar. 31, 2014.

(51) Int. Cl.
*G06F 12/00* (2006.01)
*G06F 12/0811* (2016.01)
(Continued)

(52) U.S. Cl.
CPC ...... *G06F 12/0811* (2013.01); *G06F 12/0215* (2013.01); *G06F 12/0862* (2013.01);
(Continued)

(58) Field of Classification Search
None
See application file for complete search history.

(56) References Cited

U.S. PATENT DOCUMENTS 5,551,013 A    8/1996    Beausoleil et al.
5,574,873 A    11/1996   Davidian
(Continued)

FOREIGN PATENT DOCUMENTS

WO    WO2013048468 A1    4/2013
WO    WO2013101139 A1    7/2013

OTHER PUBLICATIONS

"MMU/SLB/TLB/ERAT"; http://seniordesign,engr.uidaho.edu/2008-2009/hot-threads/docs/TajResearch.docx, pp. 1-7, downloaded from internet Feb. 26, 2014 (no additional date information available).

(Continued)

*Primary Examiner* — Charles Rones
*Assistant Examiner* — Han Doan
(74) *Attorney, Agent, or Firm* — Heslin Rothenberg Farley & Mesiti P.C.

(57) ABSTRACT

Hierarchical address translation structures providing separate translations for instruction fetches and data accesses. An address is to be translated from the address to another address using a hierarchy of address translation structures. The hierarchy of address translation structures includes a plurality of levels, and a determination is made as to which level of the plurality of levels it is indicated that translation through the hierarchy of address translation structures is to split into a plurality of translation paths. The hierarchy of address translation structures is traversed to obtain information to be used to translate the address to the another address, in which the traversing selects, based on a determination of the level that indicates the split and based on an attribute of the address to be translated, one translation path of the (Continued)

plurality of translation paths to obtain the information to be used to translate the address to the another address. The information is then used to translate the address to the another address.

5 Claims, 29 Drawing Sheets

(51) Int. Cl.
*G06F 12/02* (2006.01)
*G06F 12/0862* (2016.01)
*G06F 12/1045* (2016.01)
*G06F 12/1027* (2016.01)

(52) U.S. Cl.
CPC ...... *G06F 12/1027* (2013.01); *G06F 12/1045* (2013.01); *G06F 2212/283* (2013.01); *G06F 2212/6028* (2013.01); *G06F 2212/654* (2013.01)

(56) References Cited

U.S. PATENT DOCUMENTS

| | | | |
|---|---|---|---|
| 5,574,877 A | 11/1996 | Dixit | |
| 5,682,495 A | 10/1997 | Beavers et al. | |
| 5,790,825 A | 8/1998 | Traut | |
| 6,009,261 A | 12/1999 | Scalzi et al. | |
| 6,076,134 A | 6/2000 | Nagae | |
| RE37,305 E * | 7/2001 | Chang | G06F 11/073 711/206 |
| 6,308,255 B1 | 10/2001 | Gorishek, IV et al. | |
| 6,349,380 B1 * | 2/2002 | Shahidzadeh | G06F 12/0292 711/205 |
| 6,427,162 B1 | 7/2002 | Mohamed | |
| 6,446,034 B1 * | 9/2002 | Egolf | G06F 9/45554 703/27 |
| 6,463,582 B1 | 10/2002 | Lethin et al. | |
| 6,915,406 B2 | 7/2005 | Chiba | |
| 7,124,275 B2 * | 10/2006 | Gammel | G06F 12/1009 711/203 |
| 7,146,607 B2 | 12/2006 | Nair et al. | |
| 7,159,095 B2 | 1/2007 | Dale et al. | |
| 7,251,811 B2 | 7/2007 | Rosner et al. | |
| 7,284,112 B2 | 10/2007 | Bradford et al. | |
| 7,366,829 B1 | 4/2008 | Luttrell et al. | |
| 7,376,807 B2 | 5/2008 | Moyer | |
| 7,475,220 B1 | 1/2009 | Hastings | |
| 7,487,330 B2 | 2/2009 | Altman et al. | |
| 8,141,099 B2 | 3/2012 | DeWitt, Jr. et al. | |
| 8,255,880 B2 | 8/2012 | DeWitt, Jr. et al. | |
| 8,479,195 B2 | 7/2013 | Adams et al. | |
| 2005/0015378 A1 * | 1/2005 | Gammel | G06F 12/1009 |
| 2006/0004941 A1 * | 1/2006 | Shah | G06F 12/1027 711/3 |
| 2006/0075146 A1 * | 4/2006 | Schoinas | G06F 12/1009 710/3 |
| 2006/0161758 A1 | 7/2006 | Bradford et al. | |
| 2007/0079294 A1 | 4/2007 | Knight et al. | |
| 2007/0174553 A1 | 7/2007 | Morrow et al. | |
| 2008/0282055 A1 | 11/2008 | Yang | |
| 2009/0019252 A1 | 1/2009 | Burns et al. | |
| 2009/0172713 A1 | 7/2009 | Kim et al. | |
| 2010/0153776 A1 | 6/2010 | Vick et al. | |
| 2010/0228943 A1 * | 9/2010 | Deshpande | G06F 12/1081 711/206 |
| 2011/0173411 A1 | 7/2011 | Chen et al. | |
| 2011/0320758 A1 * | 12/2011 | Craddock | G06F 12/0292 711/206 |
| 2012/0144167 A1 | 6/2012 | Yates, Jr. et al. | |
| 2012/0198427 A1 | 8/2012 | Schmidt | |
| 2012/0255015 A1 | 10/2012 | Sahita et al. | |
| 2012/0331262 A1 | 12/2012 | Gyuris et al. | |
| 2013/0326143 A1 * | 12/2013 | Chen | G06F 12/1009 711/122 |
| 2014/0075123 A1 * | 3/2014 | Hildesheim | G06F 12/1027 711/133 |
| 2015/0032999 A1 | 1/2015 | Muff | |
| 2015/0278084 A1 | 10/2015 | Bybell et al. | |
| 2015/0278085 A1 | 10/2015 | Bybell et al. | |
| 2015/0278107 A1 | 10/2015 | Gschwind et al. | |
| 2015/0278108 A1 | 10/2015 | Gschwind | |
| 2015/0278110 A1 | 10/2015 | Gschwind | |
| 2015/0278111 A1 | 10/2015 | Gschwind et al. | |
| 2015/0278112 A1 | 10/2015 | Gschwind | |

OTHER PUBLICATIONS

"z/Architecture—Principles of Operation," IBM Publication No. SA22-7832-09, 10$^{th}$ Edition, Sep. 2012, pp. 1-1568.

Gschwind, M., E.R. Altman, "Precise Exception Semantics in Dynamic Compilation," 2002 Symposium on Compiler Construction (CC 2002), Grenoble, France, Apr. 2002, 15 pages.

Hutchinson, Luke, "Memory Address Translation," http://www.altdevblogaday.com/2011/07/24/memory-address-translation/, downloaded from internet Mar. 6, 2014, pp. 1-8.

Intel Itanium Architecture Software Developer's Manual vol. 2: System Architecture, Document No. 245318-005, Jan. 2006, pp. 1-654.

Mell, Peter and Tim Grance, "The NIST Definition of Cloud Computing," National Institute of Standards and Technology, Information Technology Laboratory, Version 15, Oct. 7, 2009, pp. 1-2.

Pagiamtzis, K. and A. Sheikholeslami, "Content-addressable memory (CAM) circuits and architectures: A tutorial and survey," IEEE Journal of Solid-State Circuits, vol. 41, No. 3, pp. 712-727, Mar. 2006.

Bybell, Anthony J., "Separate Memory Address Translations for Instruction Fetches and Data Accesses," U.S. Appl. No. 14/231,599, filed Mar. 31, 2014, 103 pages.

Gschwind, Michael K., et al., "Hierarchical Translation Structures Providing Separate Translations for Instruction Fetches and Data Accesses," U.S. Appl. No. 14/231,665, filed Mar. 31, 2014, 98 pages.

Gschwind, Michael K., "Address Translation Structures to Provide Separate Translations for Instruction Fetches and Data Accesses," U.S. Appl. No. 14/231,669, filed Mar. 31, 2014, 117 pages.

"Intel® 64 and IA-32 Architectures Software Developer's Manual—Combined vols. 1, 2A, 2B, 2C, 3A, 3B and 3C," Order No. 325462-050US, Feb. 2014, 3355 pages.

Office Action for U.S. Appl. No. 14/231,665 dated Sep. 24, 2015, pp. 1-21.

Office Action for U.S. Appl. No. 14/231,669 dated Feb. 12, 2016, pp. 1-28.

Office Action for U.S. Appl. No. 14/485,676 dated Feb. 17, 2016, pp. 1-23.

Final Office Action for U.S. Appl. No. 14/231,665 dated Mar. 10, 2016, pp. 1-22.

Office Action for U.S. Appl. No. 14/484,342 dated Apr. 29, 2016, pp. 1-44.

Power ISATM Version 2.07, May 3, 2013, pp. 1-1496.

Final Office Action, mailed Feb. 22, 2017, U.S. Appl. No. 14/485,676, 21 pages.

Final Office Action, mailed Mar. 6, 2017, U.S. Appl. No. 14/231,669, 23 pages.

Notice of Allowance and Fee(s) Due, mailed Mar. 13, 2017, U.S. Appl. No. 14/231,665, 18 pages.

Notice of Allowance and Fee(s) Due, mailed Apr. 6, 2017, U.S. Appl. No. 14/231,599, 17 pages.

Notice of Allowance and Fee(s) Due, mailed Apr. 6, 2017, U.S. Appl. No. 14/484,342, 15 pages.

* cited by examiner

HIERARCHICAL TRANSLATION STRUCTURES PROVIDING SEPARATE TRANSLATIONS FOR INSTRUCTION FETCHES AND DATA ACCESSES

CROSS-REFERENCE TO RELATED APPLICATIONS

This application is a continuation of co-pending U.S. patent application Ser. No. 14/231,665, filed Mar. 31, 2014, entitled "HIERARCHICAL TRANSLATION STRUCTURES PROVIDING SEPARATE TRANSLATIONS FOR INSTRUCTION FETCHES AND DATA ACCESSES," which is hereby incorporated herein by reference in its entirety.

BACKGROUND

One or more aspects relate, in general, to processing within a computing environment, and in particular, to memory accesses within the computing environment.

System configurations include physical memory used to store applications and data. The amount of physical memory is fixed and often inadequate to support the needs of users. Therefore, to provide additional memory or at least the appearance of additional memory, a memory management technique, referred to as virtual memory, is utilized. Virtual memory uses virtual addressing, which provides ranges of addresses that can appear to be much larger than the physical size of main memory.

To access main memory in a system configuration that includes virtual memory, a memory access is requested that includes an effective address. The effective address is translated into a real address used to access the physical memory.

Translation is performed using an address translation technique. Several address translation techniques are available. For instance, in PowerPC systems offered by International Business Machines Corporation, an effective address is translated to a corresponding real address by way of page table entries found by selecting an effective segment identifier (ESID) table entry associated with the effective address, and using the entry to locate a group of page table entries by way of a hashing algorithm. In a further example, in the z/Architecture, also offered by International Business Machines Corporation, an effective address is translated to a corresponding real address by way of a hierarchy of translation tables. Translation tables are indexed by a portion of the effective address to find the address of the next translation table of the hierarchy until a real (or absolute) address is obtained. Both address translation techniques provide advantages to their respective operating systems.

SUMMARY

Shortcomings of the prior art are overcome and advantages are provided through the provision of a method of facilitating address translation. The method includes, for instance, obtaining an address to be translated from the address to another address using a hierarchy of address translation structures, the hierarchy of address translation structures including a plurality of levels; determining at which level of the plurality of levels it is indicated that translation through the hierarchy of address translation structures is to split into a plurality of translation paths; traversing the hierarchy of address translation structures to obtain information to be used to translate the address to the another address, the traversing selecting, based on a determination of the level that indicates the split and based on an attribute of the address to be translated, one translation path of the plurality of translation paths to obtain the information to be used to translate the address to the another address; and using the information to translate the address to the another address.

Methods and systems relating to one or more embodiments are also described and claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

In accordance with one or more aspects, a capability is provided to enable separate memory address translations for instruction fetches and data accesses to regions of memory, while providing common memory address translations to other regions of memory. This enables, for instance, transparency when code modifications occur by enabling the view of the memory as seen by the programs fetching instructions to be fenced off as compared to that of the data accesses.

Computing environments of different architectures may incorporate and use one or more aspects of the address translation capability provided herein. For instance, environments based on the PowerPC architecture, also referred to as Power ISA, offered by International Business Machines Corporation (IBM®) and described in the Power ISA™ Version 2.07, May 3, 2013, hereby incorporated by reference herein in its entirety, may include one or more aspects, as well as computing environments of other architectures, such as the z/Architecture, offered by International Business Machines Corporation, and described in z/Architecture—Principles of Operation, Publication No. SA22-7832-09, 10th Edition, September 2012, which is hereby incorporated by reference herein in its entirety.

POWER, POWER ARCHITECTURE, POWERPC, Z/ARCHITECTURE, IBM, AIX, POWERVM, Z/OS and Z/VM (referenced herein) are registered trademarks of International Business Machines Corporation, Armonk, N.Y. Other names used herein may be registered trademarks, trademarks or product names of International Business Machines Corporation or other companies.

Figure 1:
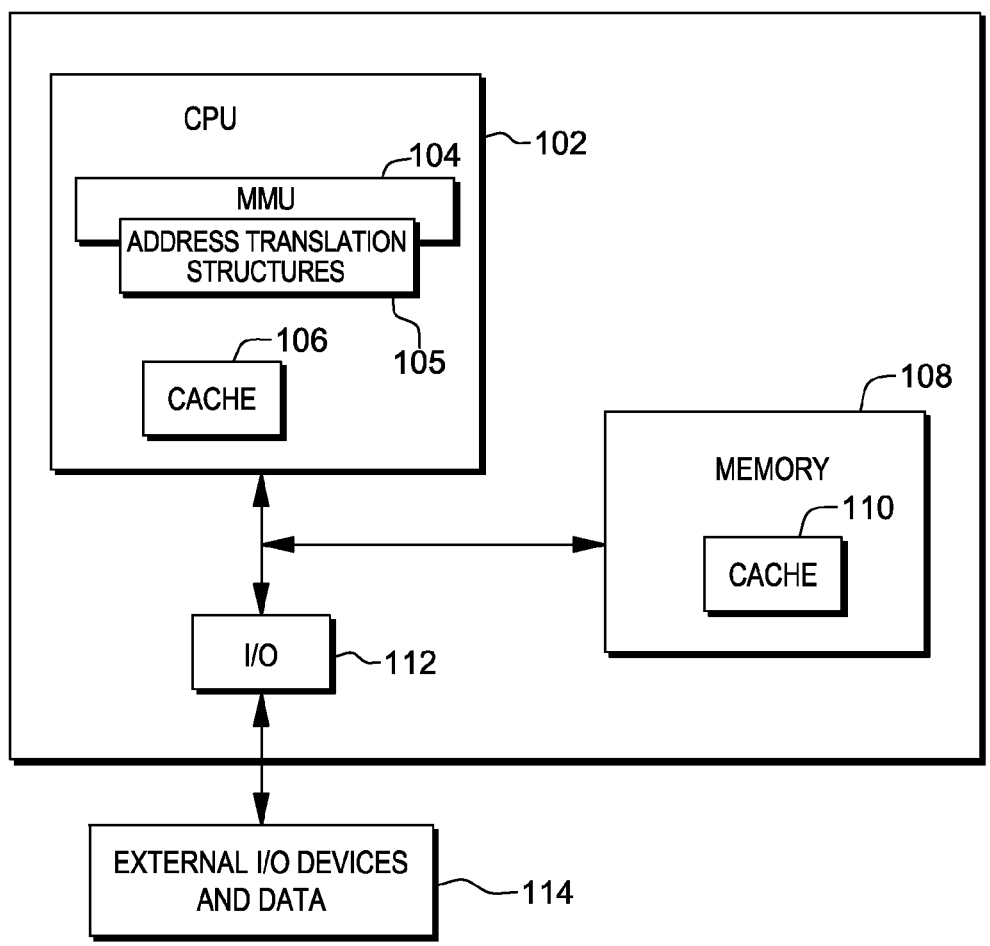
FIG. 1 depicts one example of a computing environment to incorporate and use one or more aspects of an address translation capability.

One example of a computing environment to incorporate and use one or more aspects of the address translation capability is described with reference to FIG. 1. In one example, a computing environment 100 includes a processor (central processing unit—CPU) 102 that includes at least one memory management unit (MMU) 104, one or more address translation structures 105, and one or more caches 106. Processor 102 is communicatively coupled to a memory portion 108 having one or more caches 110, and to an input/output (I/O) subsystem 112. I/O subsystem 112 is communicatively coupled to external I/O devices 114 that may include, for example, data input devices, sensors and/or output devices, such as displays.

Memory management unit 104 is used in managing memory portion 108 including facilitating access to the memory by providing address translation. To improve address translation, the memory management unit utilizes one or more address translation structures 105 including, for instance, a translation lookaside buffer (TLB) and/or a segment lookaside buffer (SLB) which, in one embodiment, are located in the MMU. Other address translation structures may be used in addition to or in lieu of those mentioned herein, and they may be located within or outside the MMU.

Figure 2:
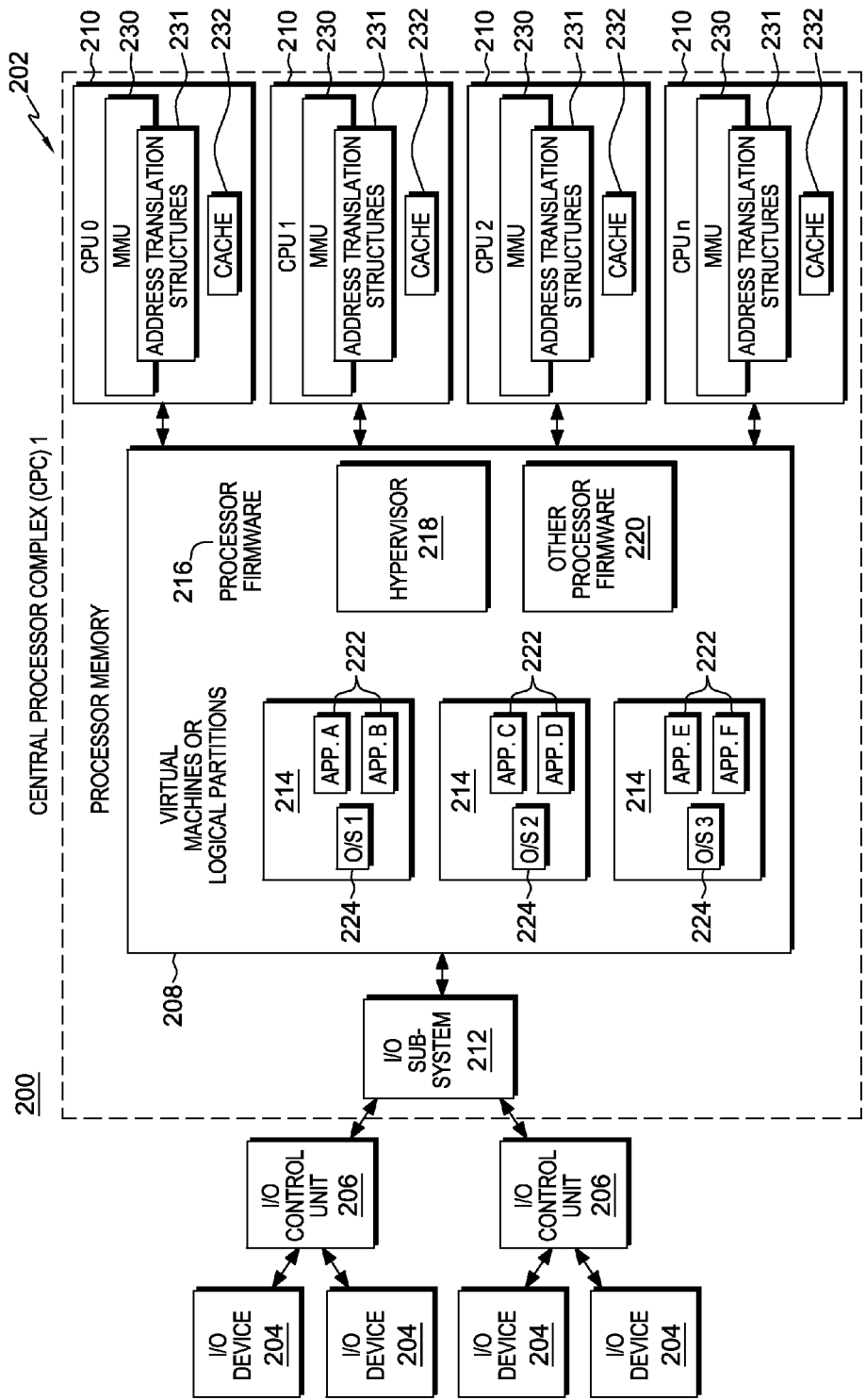
FIG. 2 depicts another example of a computing environment to incorporate and use one or more aspects of an address translation capability.

A further embodiment of a computing environment to incorporate and use one or more aspects of the address translation capability is depicted in FIG. 2. Referring to FIG. 2, in one example, a computing environment 200 includes a central processor complex (CPC) 202 coupled to one or more input/output (I/O) devices 204 via one or more control units 206. Central processor complex 202 includes processor memory 208 (a.k.a., main memory, main storage, central storage) coupled to one or more central processors (a.k.a., central processing units (CPUs)) 210 and an I/O subsystem 212, each of which is further described below.

Processor memory 208 includes one or more virtual machines 214 (for one example of the PowerPC architecture) or one or more logical partitions 214 (for one example of the z/Architecture), and processor firmware 216, which includes a hypervisor 218 and other processor firmware 220. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each virtual machine or logical partition 214 functions as a separate system and has one or more applications 222, and optionally, a resident operating system 224 therein, which may differ for each virtual machine or logical partition. In one embodiment, the operating system is the z/VM operating system, the z/OS operating system, the z/Linux operating system, the TPF operating system, the AIX operating system, the Power Linux operating system, the IBM i/OS operating system, or another operating system, offered by International Business Machines Corporation, Armonk, N.Y.; or another operating system offered by another company. The virtual machines are managed by hypervisor 218, such as PowerVM, offered by International Business Machines Corporation, Armonk, N.Y.; and the logical partitions are managed by hypervisor 218, such as the Processor Resource/System Manager (PR/SM), offered by International Business Machines Corporation, Armonk, N.Y.

Central processors 210 are physical processor resources assignable to the virtual machines or allocated to the logical partitions. For instance, each virtual machine or logical partition 214 includes one or more logical processors, each of which represents all or a share of a physical processor 210 that may be dynamically allocated to the virtual machine or partition. A central processor may include a memory management unit (MMU) 230 and one or more address translation structures 231 providing the address translation capability described herein, and at least one cache 232.

Input/output subsystem 212 directs the flow of information between input/output devices 204 and main memory 208. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. Further, the I/O subsystem uses one or more input/output paths as communication links in managing the flow of information to or from input/output devices 204.

Figure 3A:
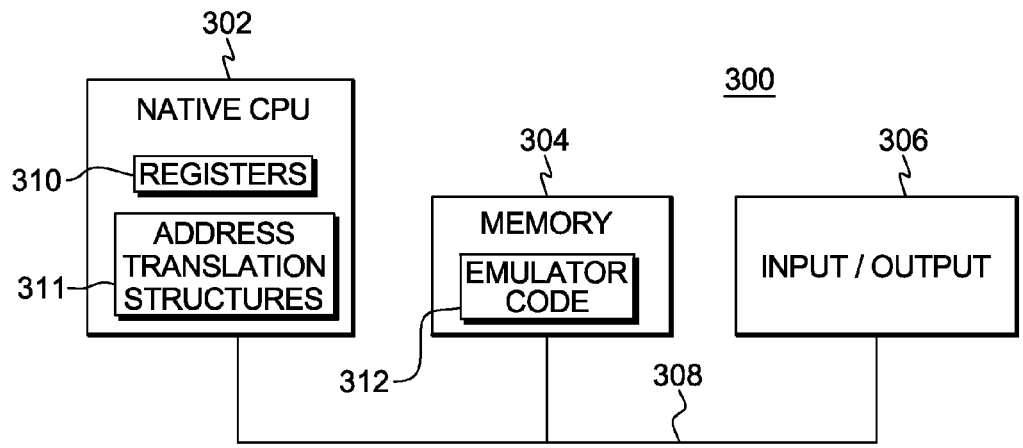
FIG. 3A depicts yet another example of a computing environment to incorporate and use one or more aspects of an address translation capability.

Another embodiment of a computing environment to incorporate and use one or more aspects of the address translation capability is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment, as well as one or more address translation structures 311. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture, or allows machines based on architectures other than the Power Architecture, such as HP Superdome servers or others, to emulate the Power Architecture and to execute software and instructions developed based on the Power Architecture.

Figure 3B:
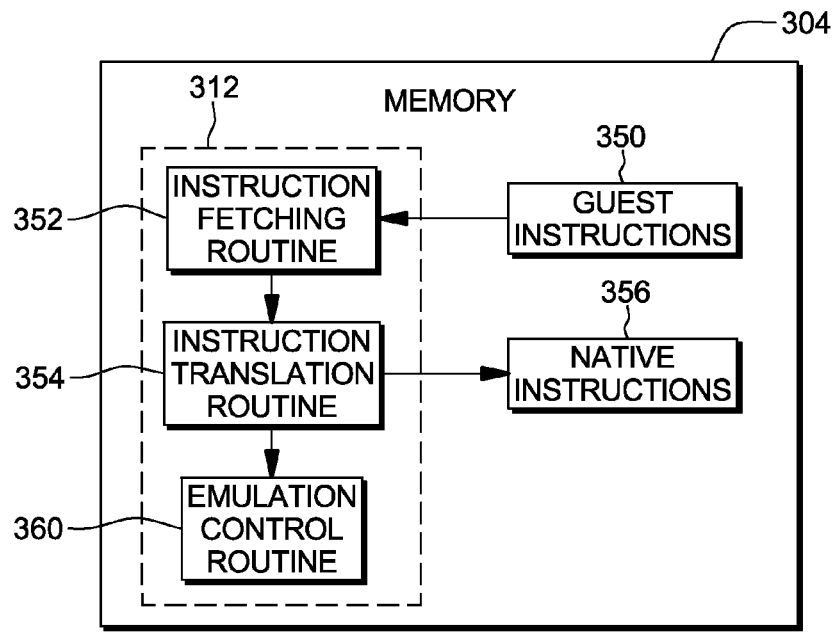
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a Power Architecture or z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Computing environments, such as those described above, are enhanced by including components that alter application programs executing within the environments to provide those application programs with additional features. For instance, a component, referred to as dynamic code optimization (DCO), may be provided that examines programs as they are executing, recognizes frequently executed code segments and optimizes those segments. Other types of optimization are also possible, as well as other types of components. Further, changes may be made to programs for other reasons, such as correcting an error, providing workarounds for known hardware errata, enhancing security, etc.

Changing a program while it is executing is complicated and issues may arise. For instance, if a program references itself, i.e., it is self-referential, it may detect the change and refuse to run or the change may cause it to run improperly due to it being self-referential. An example of a self-referential code may be a binary that validates its own correctness by computing the checksum of its program code, and comparing the computed result with an expected result to avoid tampering. Thus, in accordance with one aspect, a capability is provided that allows applications to be modified, while preserving self-referential integrity.

In one example, for dynamic code optimization, code that is not frequently used is maintained unchanged, and code that is frequently used, referred to as hot spots, are dynamically compiled into optimized code and the pre-existing code is patched to integrate the optimized code into the pre-existing code generating patched code. Then, to transfer to the optimized code, the original binary is modified (patched) by inserting a jump instruction to jump to the optimized code and when done, another jump instruction is inserted to jump back to the original code.

Figure 4:
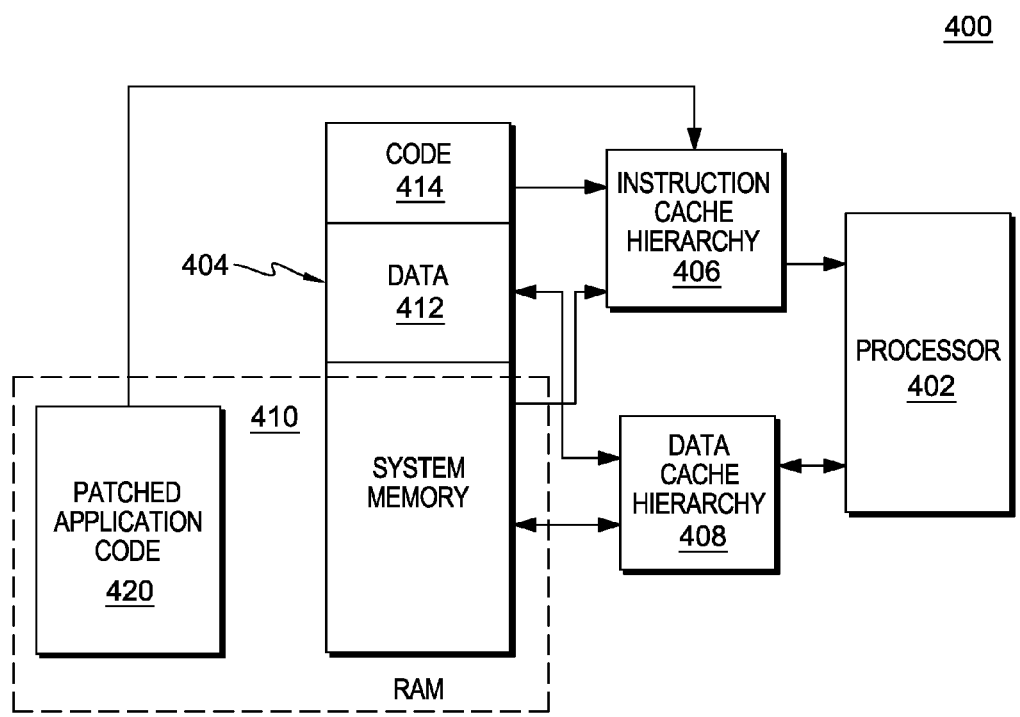
FIG. 4 depicts one example of a computing environment including patched application code.

One example of a computing environment that includes patched code is depicted in FIG. 4. This computing environment is based, for instance, on the PowerPC architecture offered by International Business Machines Corporation, however many other systems may incorporate and use one or more of the aspects described herein. As shown, a computing environment 400 includes, for instance, a processor 402 coupled to a memory 404 via one or more caches 406, 408. Memory 404 is, for instance, random access memory, having a plurality of portions, including, for example, system memory 410, data memory 412, and code memory 414 (also referred to as instruction memory). In one example, system memory 410 includes application code, including, for instance, patched application code 420, and/or data for one or more applications; data memory 412 is memory used by, for instance, an optimizer; and code memory 414 is, for instance, code of the optimizer. Code memory 414 is coupled to instruction cache 406 accessed by processor 402; and data memory 412 and system memory 410 are coupled to data cache 408 accessed by processor 402. Further, system memory 410, including patched application code 420, is also coupled to instruction cache 406.

When code is patched, in accordance with one or more aspects, separate address translation is provided, which depends, for instance, on whether the translation is for an instruction fetch or a data access. For instance, data accesses (e.g., address translation for data accesses) are directed to the unmodified code (i.e., one or more first memory regions), while code translation (e.g., address translation for instruction fetches) is directed to the modified code (i.e., one or more second memory regions). Additionally, instruction fetches and data accesses for code of the application that has not been copied are directed to the same pre-existing code, which are also stored in the one or more first memory regions, in this example. This separate address translation capability, in conjunction with the memory mapping in, for instance, FIG. 4, allows the view of memory from the instruction fetcher to be fenced off, enabling the use of patched code while maintaining referential integrity.

As indicated, to facilitate maintaining referential integrity and fencing off the view of memory from the instruction fetcher, separate address translations are provided for addresses of instruction fetches and data accesses. One address translation scheme to provide this separate address translation, referred to herein as separate instruction (I)/data (D) translations, is a hierarchical address translation scheme. Address translation schemes, including those that use a hierarchy of translation tables, are described below, as well as in the following publications, as examples: z/Architecture—Principles of Operation, Publication No. SA22-7932-09, 10th Edition, September 2012; Intel® 64 and IA-32 Architectures Software Developer's Manual—Combined Volumes: 1, 2A, 2B, 2C, 3A, 3B and 3C, Order Number 325462-050US, February 2014; and Intel Itanium Architecture Software Developer's Manual Volume 2: System Architecture, Document Number: 245318-005, each hereby incorporated by reference in its entirety herein. In one example, for the z/Architecture, the hierarchy of tables is referred to as dynamic address translation (DAT) tables; and for Power ISA, the tables are referred to as radix tables.

Figure 5A:
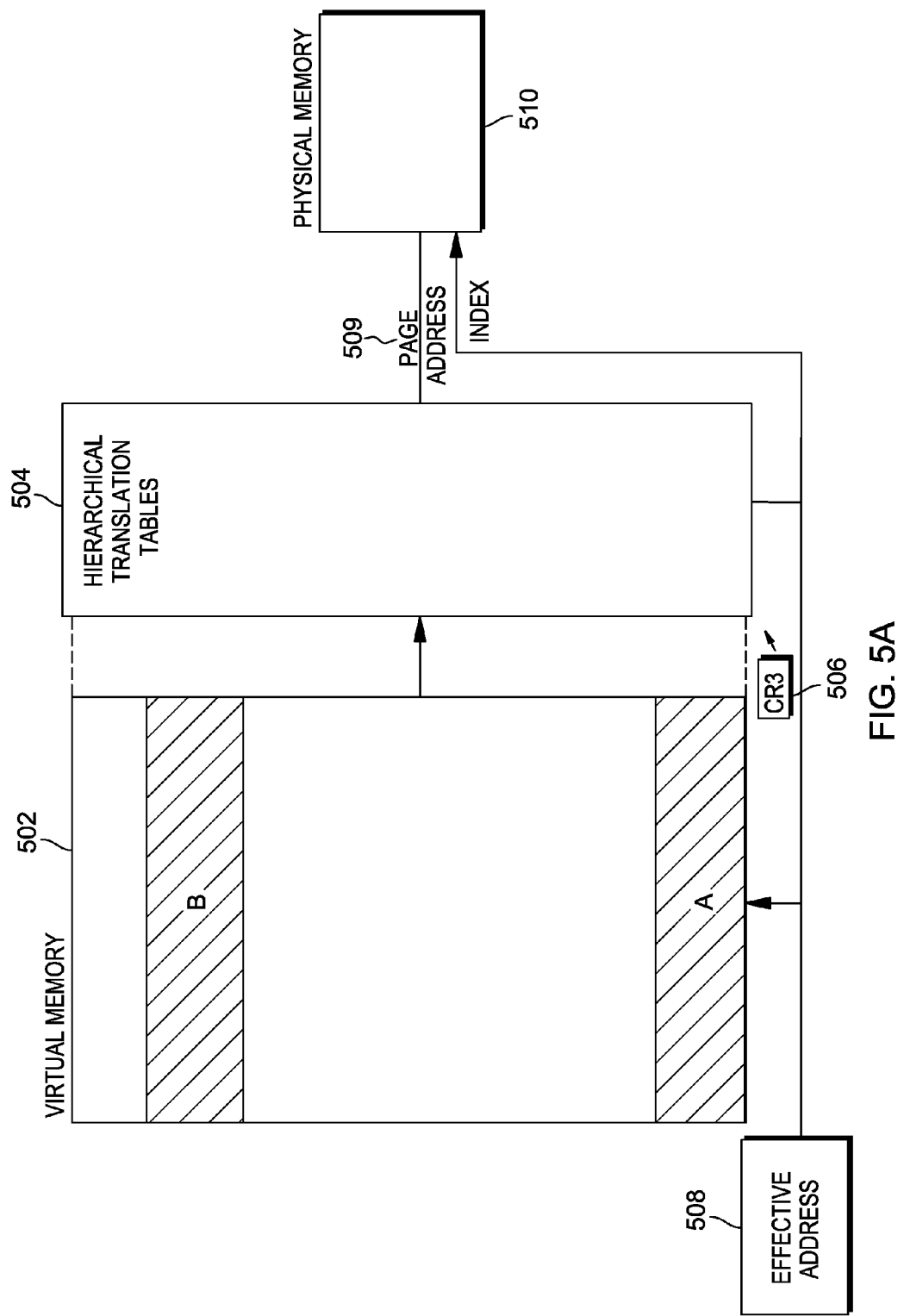
FIG. 5A depicts one example of a hierarchical translation mechanism.

One example of a hierarchical address translation mechanism is described with reference to FIG. 5A. In this example, hierarchical translation tables 504 are provided for translating addresses of virtual memory 502, though only regions A and B are to be used, in this example, to real addresses. The origin of the highest order translation table of the hierarchical translation tables 504, is provided, for example, by a control register (CR3) 506. An effective address 508 is used to index into each table of the hierarchical translation tables 504 to determine an origin address of the next table until, for example, a page table entry (PTE) having an address 509 of a page of physical memory 510 is located. In one example in which the translation mechanism is DAT, the effective address is a virtual address having a plurality of indices used to index into the translation tables.

Figure 5B:
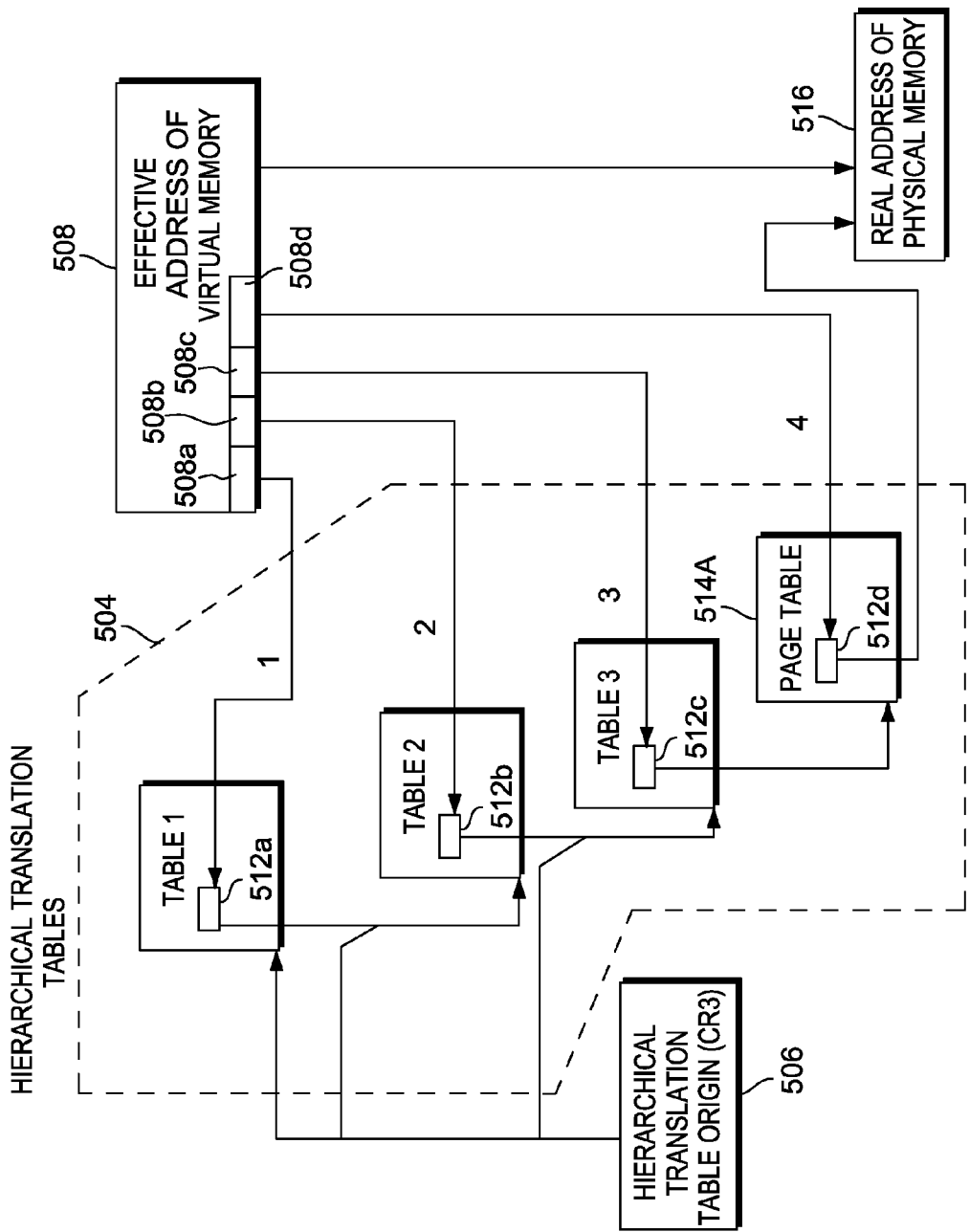
FIG. 5B depicts one example of indexing of high-level translation tables.

FIG. 5B shows one example in which the highest level translation table of the hierarchy is "indexed" by a high portion 508a of an effective address 508 to locate a Table 1 entry 512a that is used to locate the next translation table (Table 2). That is, entry 512a includes an origin address of Table 2. Similarly, a next portion 508b of the effective address 508 is used to index into Table 2 to find a Table 2 entry 512b having the origin address of Table 3. A next portion 508c of the effective address 508 is used to index into Table 3 to find a Table 3 entry 512c having an origin address of a Page Table 514a. A next portion 508d of the effective address 508 is used to index into Page Table 514a to locate a page table entry 512d having the address of a physical memory page 516. The origin of the hierarchy of translation tables, in one embodiment, may include a table selector field for determining which of the hierarchy of translation tables, the origin applies. Thus, the translation may require only a subset of the hierarchy (wherein an effective address is limited to include a predetermined number of most significant bits having a zero value). A translation using fewer tables will be faster than one using more tables.

Figure 6A:
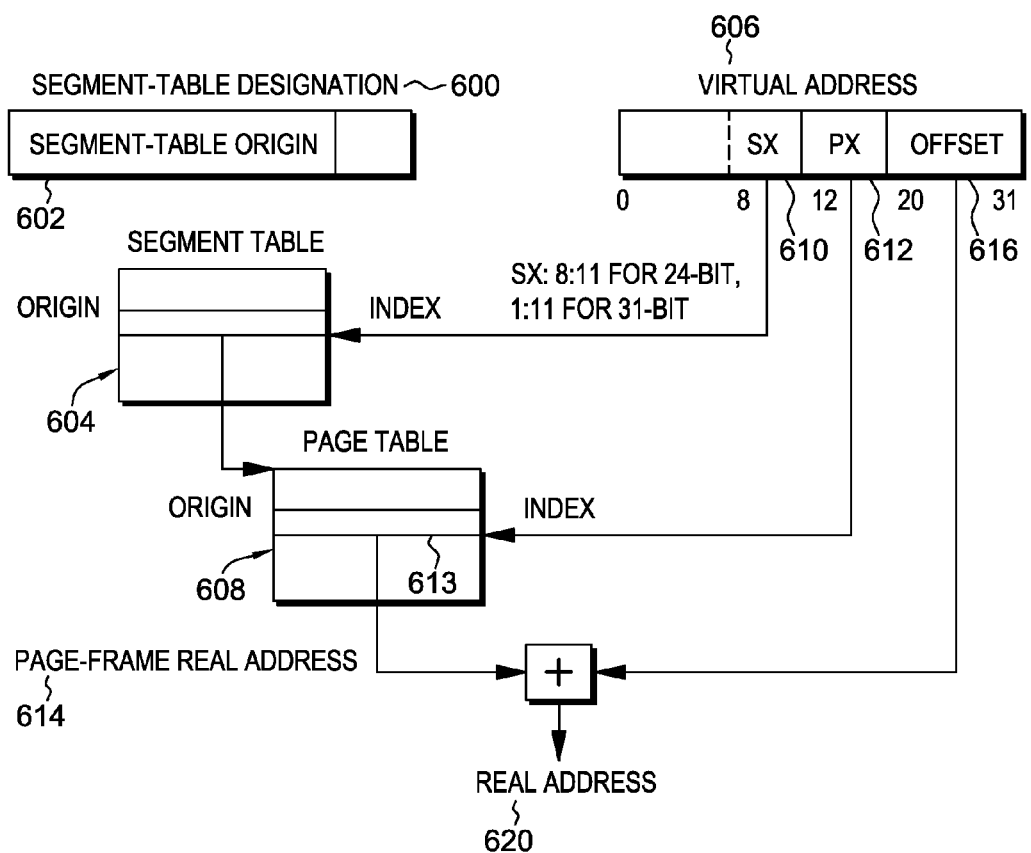
FIG. 6A depicts one embodiment of a 31-bit address translation.

One particular example of using a virtual address to index into a plurality of hierarchical translation tables to obtain a real address in a 31-bit translation is described with reference to FIG. 6A. In this example, a segment table designation 600 includes a segment table origin 602 providing an origin of a segment table 604. Selected bits of a virtual address 606 are used to index into segment table 604 to obtain an origin of a page table 608. In particular, for a 24-bit translation, bits 8-11 (SX) of the virtual address are used to index into the segment table, and for a 31-bit translation, bits 1-11 are used. Thereafter, a portion of virtual address 606 (e.g., PX, bits 12-19) is used to index into the page table to locate a page table entry (PTE) 613 having a page frame real address (PFRA) 614. The page frame real address is combined (e.g., concatenated) with an offset 616 (e.g., bits 20-31) of virtual address 606 to obtain a real address 620.

Figure 6B:
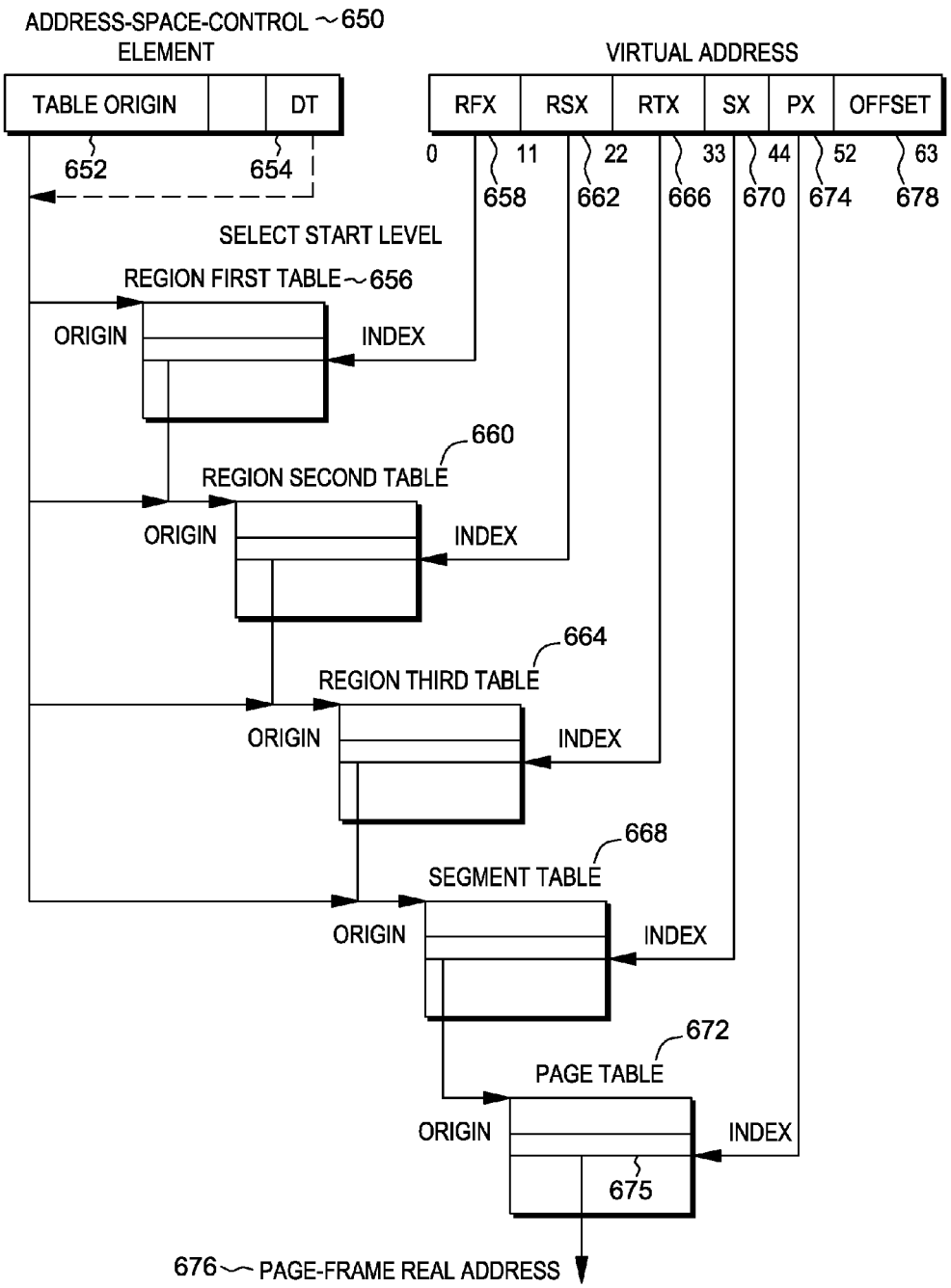
FIG. 6B depicts one embodiment of a 64-bit address translation.

Similarly, use of the virtual address to obtain a real address in 64-bit translation is described with reference to FIG. 6B. In this example, an address space control element 650 includes a table origin 652, as well as a designation type (DT) control 654, which is an indication of a start level for translation (i.e., an indication at which level in the hierarchy address translation is to begin). Using table origin 652 and DT 654, the origin of a particular table is located. Then, based on the table, bits of the virtual address are used to index into the specific table to obtain the origin of the next level table. For instance, if the region first table 656 is selected, then bits 0-10 (RFX—region first index) 658 of the virtual address are used to index into the region first table to obtain an origin of a region second table 660. Then, bits 11-21 (RSX—region second index) 662 of the virtual address are used to index into region second table 660 to obtain an origin of a region third table 664. Similarly, bits 22-32 (RTX—region third index) 666 of the virtual address are used to index into region third table 664 to obtain an origin of a segment table 668. Then, bits 33-43 (SX—segment index) 670 of the virtual address are used to index into segment table 668 to obtain an origin of page table 672, and bits 44-51 (PX—page index) 674 of the virtual address are used to index into page table 672 to obtain a page table entry (PTE) 675 having a page frame real address 676. The page frame real address is then combined (e.g., concatenated) with offset 678 (bits 52-63) to obtain a real address.

As described above, the hierarchy of address translation structures includes a plurality of levels, e.g., levels 1-n, n being the last level. Traversal of the hierarchy of address translation structures eventually locates an entry in an address translation structure at the last level (e.g., a page table entry (PTE)). The page table entry located by traversing the hierarchical page tables includes various information including at least a portion of a real address used to access the physical memory. The format and information included in the page table entry depends on the architecture of the system configuration and/or the specific type of translation.

Figure 7A:
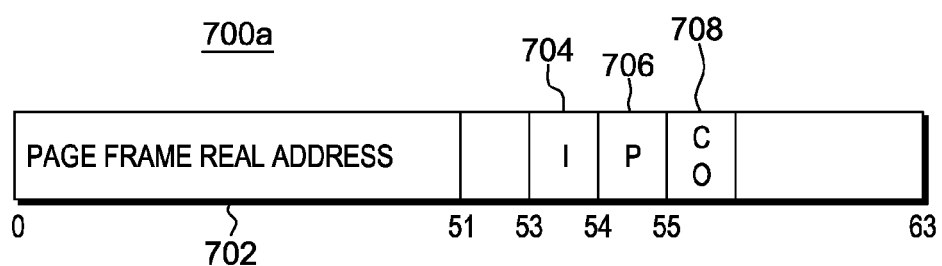
FIG. 7A depicts one example of a page table entry.

In one example in which the address translation is the dynamic address translation (DAT) of the z/Architecture, a page table entry 700*a* includes the following, as depicted in FIG. 7A:

Page-Frame Real Address (PFRA) (702): Bits 0-51 provide the leftmost bits of a real storage address. When these bits are concatenated with the 12-bit byte index field (a.k.a., the offset) of the virtual address on the right, a 64-bit real address is provided;

Page-Invalid bit 704 (I): Bit 53 controls whether the page associated with the page table entry is available. When the bit is zero, address translation proceeds by using the page table entry. When the bit is one, the page table entry is not to be used for translation;

DAT-Protection Bit (P) 706: Bit 54 controls whether store accesses can be made in the page. This protection mechanism is in addition to the key-controlled-protection and low-address-protection mechanisms. The bit has no effect on fetch accesses; and Change-Recording Override (CO) 708: When enhanced DAT does not apply, bit 55 of the page-table entry is to contain zero; otherwise, a translation-specification exception is recognized as part of the execution of an instruction using that entry for address translation. When enhanced DAT applies and a segment table entry (STE) format control is zero, bit 55 of the page-table entry is the change-recording override for the page.

Although various fields are described above, in other embodiments, more, less and/or different fields may be included in a page table entry.

In accordance with one aspect, pages in the translation tables can have separate translation entries based on attributes of addresses being translated (e.g., translation for instruction fetches or data accesses). However, because a hierarchical translation structure, such as dynamic address translation (DAT) and radix tables, are densely packed, a single entry in a page corresponding to an address range and pointing to either a physical address or another directory cannot be readily replaced by two pointers without modifying the table layout and making additional changes to the page translation structure. Thus, various embodiments are offered in order to provide separate translations based on attributes of the addresses being translated (e.g., for instruction fetches or data accesses), as described herein.

Figure 7B:
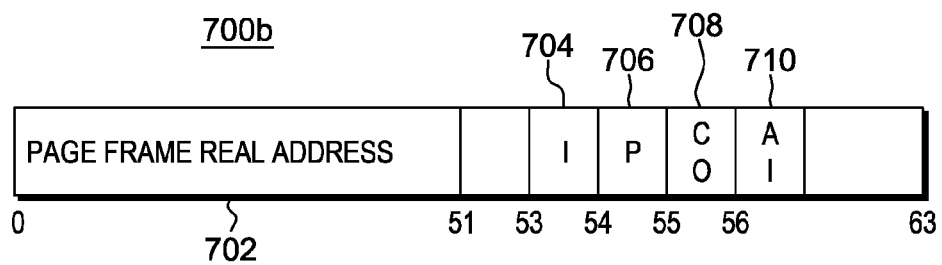
FIG. 7B depicts another example of a page table entry with an attribute indicator.

In one embodiment, a page table entry is modified to indicate that the page is maintained in separate versions based on an attribute (e.g., for instruction fetches or data accesses). In this one embodiment, as shown in FIG. 7B, an attribute indicator (AI) 710 is added to a page table entry 700*b* to indicate a split. The split indicates that there are a plurality of paths that may be taken to obtain, e.g., the physical address, which may be different for each path. In one embodiment, the layout of the address translation structures is not changed, and thus, multiple real page frame addresses are not specified. Therefore, in one embodiment, the instruction and data pages are in a predefined relationship with one another, and one translation path is used to obtain an instruction page, and another translation path is used to obtain a data page.

For example, in one embodiment, when a page frame real address (PFRA) is specified, the specified page frame real address refers to the page frame real address of the instruction page, and the data page is at a predefined offset therefrom. For instance, the data page is at page frame real address plus one; or the page frame real address is specified as even, and thus, the paired page is computed as PFRA|1. In yet another embodiment, the page frame real address specified is even, so the paired page can be computed with PFRA^1. Other equations may be used for pairing. Further, in another embodiment, the PFRA specifies the data page and the instruction page is a predefined offset therefrom. In embodiments, the offset is a constant defined at design time; a constant obtained from a register (e.g., a control register or a scan register); or it is configured, or part of configuration information. It may apply to all partitions in a computing environment; one or more, but less than all partitions; to a guest, such as a VM guest, etc. In one or more embodiments, an offset may be selectable from a small plurality of defined offsets by one or more bits in the PTE.

One or more fields of the page table entry (e.g., I, P, CO) may apply to both translations. In another embodiment, one or more of the fields are replicated in the unused portion of the PTE, and the first set of fields apply to translations for one attribute (e.g., instruction fetches), and the other set of fields apply to translations for another attribute (e.g., data accesses).

Figure 8:
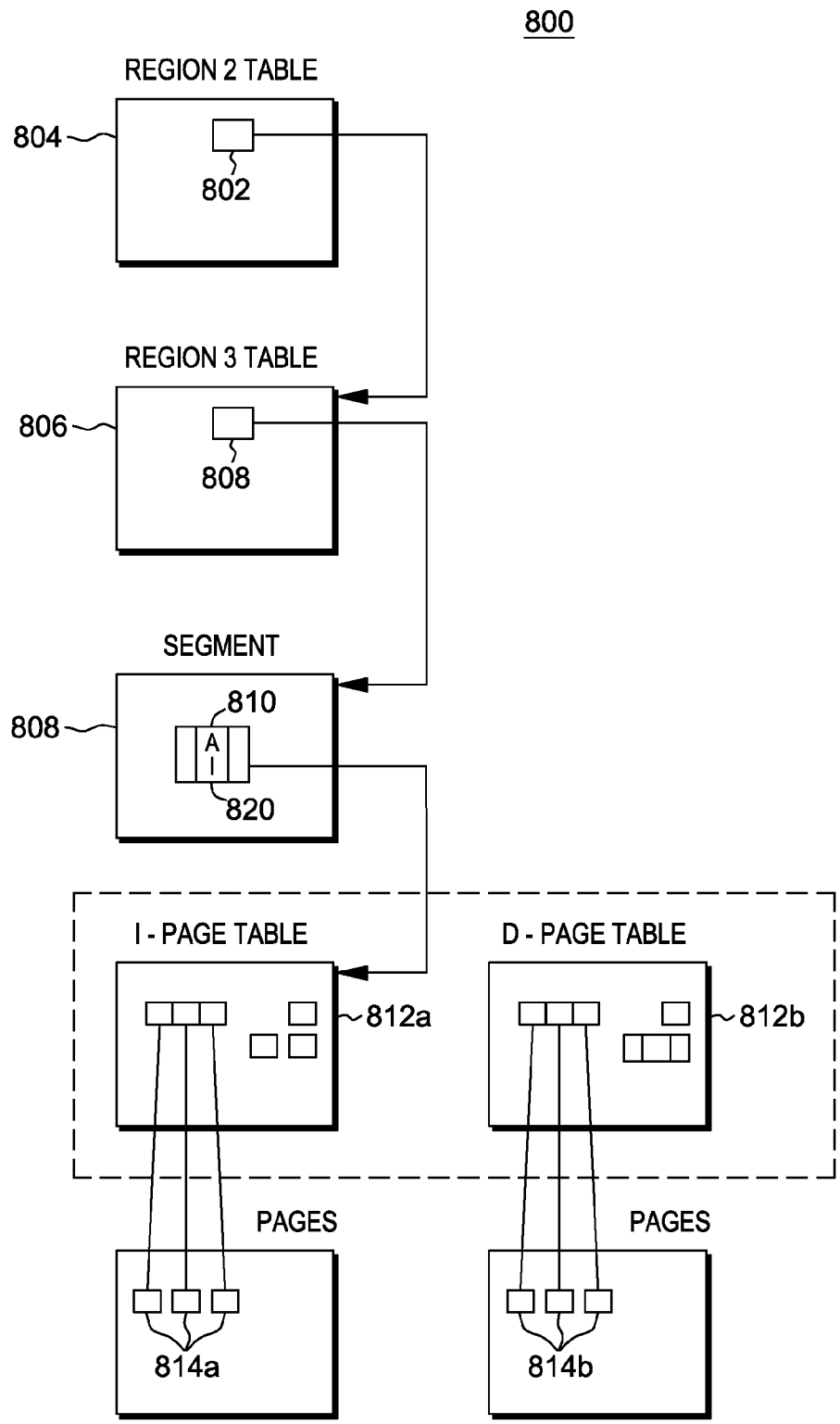
FIG. 8 depicts one example of a hierarchy of address translation structures having paired page tables, each page table being associated with an attribute of an address to be translated.

In a further embodiment, the fixed linking of pages of the previous embodiment is avoided. Instead, at least one of the address translation structures in the hierarchy (e.g., the lowest level structure—the page table) is extended to include a pair of structures, one for translations for instruction fetches, and one for translations for data accesses, as shown in FIG. 8. Referring to FIG. 8, a hierarchy of address translation structures 800 is depicted. As shown in this particular embodiment, an entry 802 of a Region 2 table 804 is used to indicate an origin of a Region 3 table 806. An entry 808 within Region 3 table 806 is used to indicate an origin of a segment table 808. Further, an entry 810 in segment table 808 is used to indicate an origin of a page table. In this example, it is the origin of instruction page table 812*a*, since the page table is designed as providing instruction page table 812*a* first, and a data page table 812*b* is at a predefined offset therefrom. To obtain the origin of data page table 812*b*, the predefined offset is, e.g., added to the origin located in entry 810. Entries within page table 812*a*, 812*b* indicate specific pages 814*a* or 814*b*, depending on the page table selected. The offset may be defined in a number of ways, e.g., using control or scan registers, configuration registers, or selectable from among a variety of possible values by one or more bits of entry 810.

An attribute indicator (AI) 820 is included, in one embodiment, in at least one of the address translation structures to indicate that there is a split in translation, providing a plurality of paths of translation depending on an attribute of the address to be translated. In one example, one attribute is translations for instruction fetches and another attribute is translations for data accesses. In this particular embodiment, attribute indicator 820 is included in the segment table, and in particular, in entry 810 of the segment table. For instance, each entry within the segment table or selected entries include an attribute indicator indicating whether translation is split after the segment table translation, and thus, is based on the attribute, such as instruction fetch or data access. A path is defined through the hierarchy which depends on the attribute, e.g., whether the address to be translated is for an instruction fetch or data access (or another attribute, such as, load/store; or others).

For other embodiments, the attribute indicator may be included in other address translation structures, including but not limited to, the Region 3 table, the Region 2 table or other such tables within the hierarchy. Further, in yet other embodiments, the attribute indicator is not included in an address translation structure, but instead, in a control register or in another register, or provided in the configuration. Again, it indicates after which level of translation the split is to occur, providing a plurality of translation paths, from which one path is selected to obtain information to translate the address to another address.

In one embodiment, all page tables (also referred to as leaf directories) may be paired—one for each attribute; however, this would increase space usage. Thus, in other embodiments, only some processes, or address spaces contain one or more paired tables, and pairing is selected by a register, such as a control register or a special purpose register; an address space identifier; or other register or indicator. Thus, this may be selected for processes subject to dynamic code optimization.

Further, in some architectures, the page table uses only a half page of physical memory, allowing separate I and D tables to fit in one physical page, simplifying page buffer management in an operating system.

Figure 9:
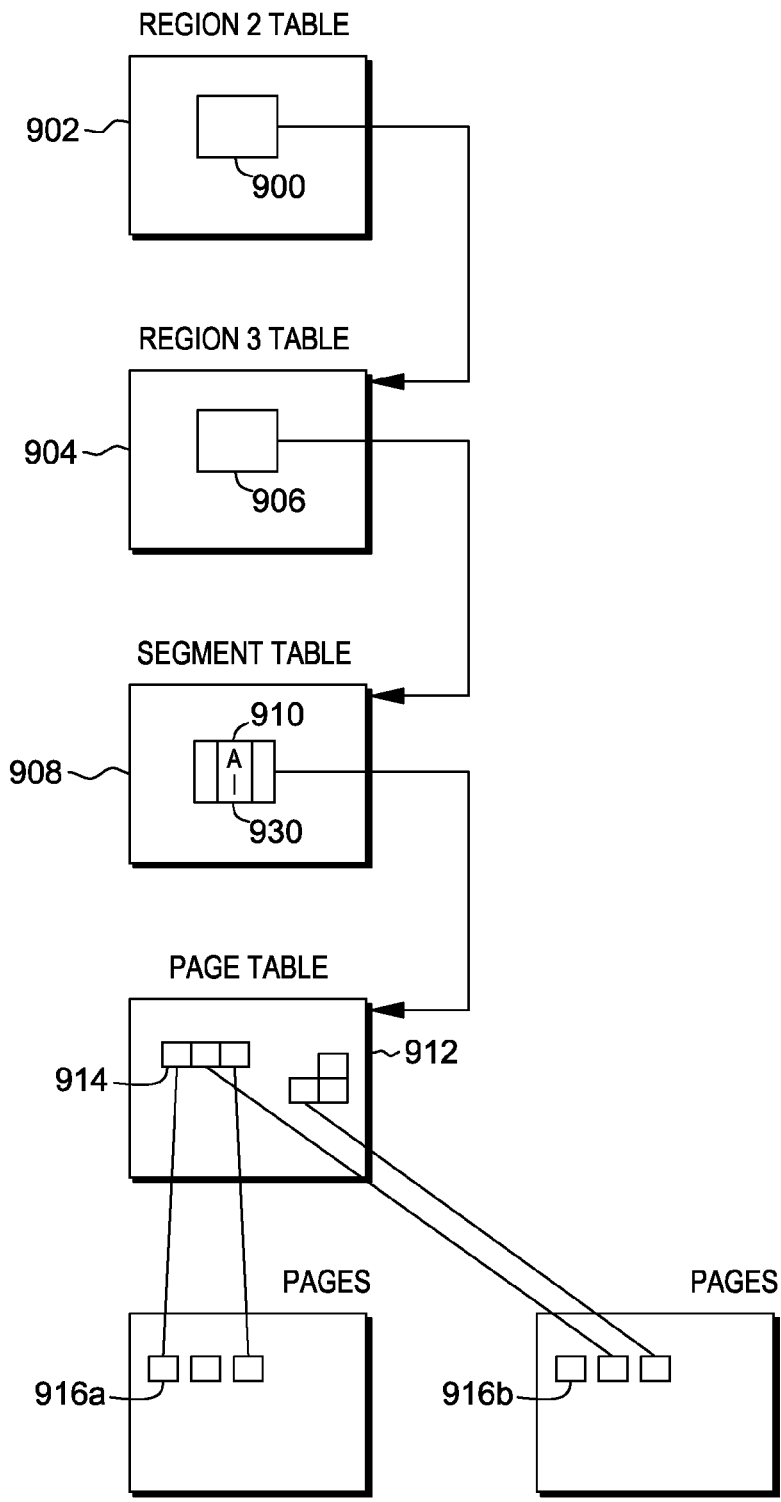
FIG. 9 depicts one example of a hierarchy of address translation structures having one page table with multiple page table entries for an address to be translated, one for each attribute of the address.

In an alternate embodiment, there is a single page table and page table entries within the page table are paired, thus requiring a larger page table directory. An example of this is shown in FIG. 9. In this particular example, an entry 900 of Region 2 table 902 is used to indicate an origin of Region 3 table 904, and an entry 906 within Region 3 table 904 is used to indicate an origin of segment table 908. An entry 910 in segment table 908 is used to indicate an origin of page table 912. In this embodiment, page table 912 includes a plurality of entries, including entries for multiple attributes (e.g., entries for translations for instruction fetches and entries for translations for data accesses). The different entries are interleaved, in one embodiment. An entry 914 in page table entry 912 may then point to a page 916a or a page 916b, in which 916a may be for instruction fetches and 916b may be for data accesses, depending on the attribute.

An attribute indicator 930 in, for instance, entry 910 of segment table 908 may be used to specify that a split occurs after the segment table translations, and that one path may include a PTE for translations for instruction fetches and another path may include a PTE for translations for data accesses. Although in this particular example the attribute indicator is in an entry of the segment table, in other embodiments, it may be in other address translation structures, such as the Region 3 table or the Region 2 table, as examples; or it may be indicated in a register, etc. In one embodiment, each entry of the selected table (e.g., segment table in this example) includes an attribute indicator to define a path through the hierarchy of address translation tables; or in another embodiment, some entries include the attribute indicator, while others do not. In the case where an entry does not include the attribute indicator, the same page is used for translation, regardless of the attribute (e.g., regardless of whether the address being translated is for an instruction fetch or a data access).

In one or more embodiments, when page table entries are replicated, not every physical page needs to be replicated. Rather, code pages that have not been modified can be pointed to by instruction fetch and data entries. Data only pages can be provided, while providing a null address or other non-translation indicator for instruction fetches, and vice versa.

Figure 10:
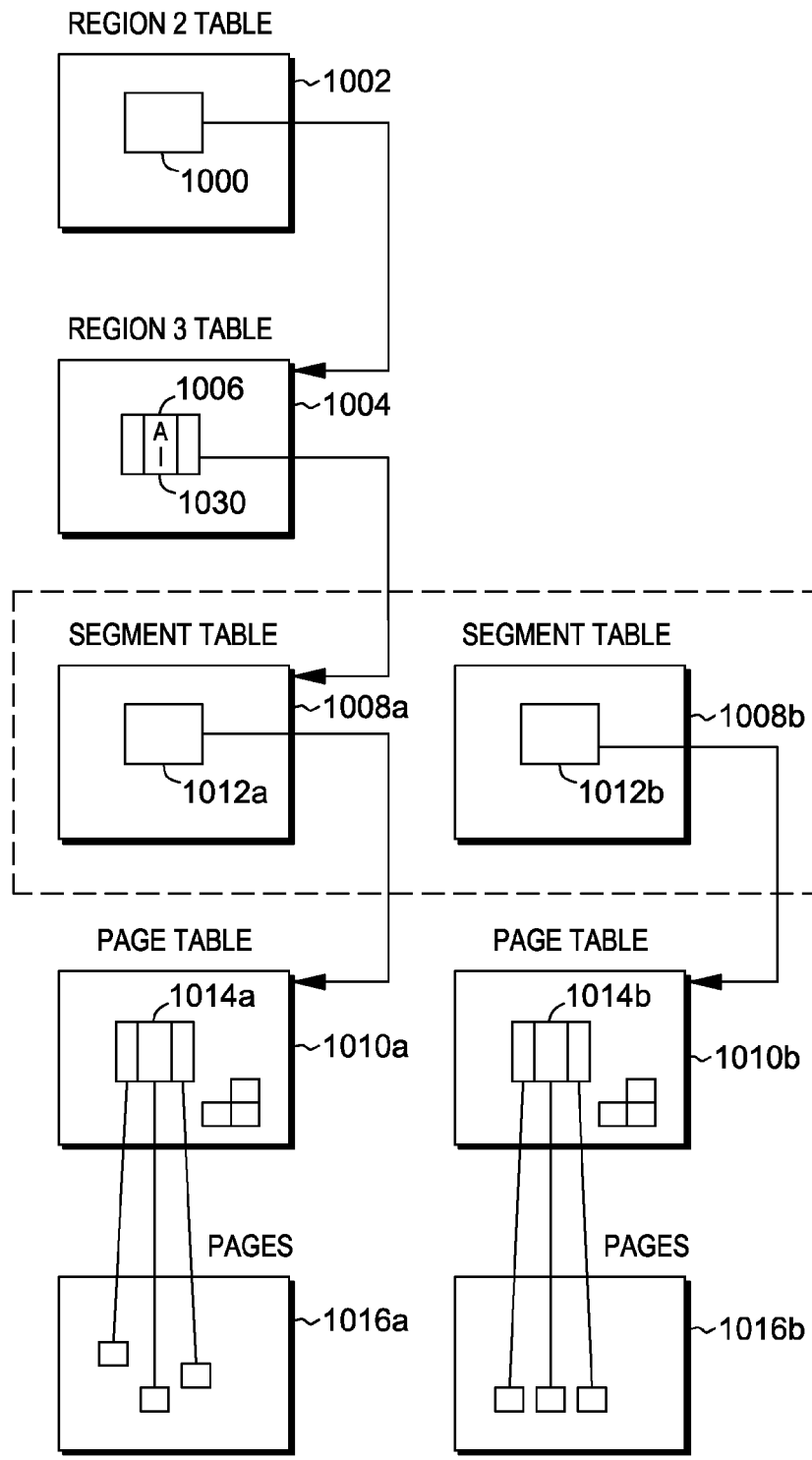
FIG. 10 depicts another example of a hierarchy of address translation structures having paired segment tables and page tables.

Referring to FIG. 10, in yet a further embodiment, certain address translation structures in the hierarchy, such as the segment tables (or the region tables or other tables used) may be replicated and one is used for translations for instruction fetches and the other is used for translations for data accesses (or based on other attributes). As shown in FIG. 10, an entry 1000 within a Region 2 table 1002 is used to indicate an origin of a Region 3 table 1004, and an entry 1006 in the Region 3 table is used to point to an origin of segment table 1008a. In this implementation, segment table 1008a is paired with a segment table 1008b, and segment table 1008b is at an offset from segment table 1008a. Thus, entry 1006 points to segment table 1008a and the origin of segment table 1008b is determined based on the offset of segment table 1008b from segment table 1008a. An entry is selected (using SX of the virtual address) from segment table 1008a or segment table 1008b based on the attribute of the address to be translated (e.g., for an instruction fetch or a data access).

In this particular example, the page tables are also duplicated, and thus, one page table 1010a is associated with segment table 1008a and another page table 1010b is associated with segment table 1008b. In particular, an entry 1012a of segment table 1008a is used to provide an origin of page table 1010a, and an entry 1012b of segment table 1008b is used to indicate an origin of page table 1010b. Page table entries 1014a then point to pages 1016a, and page table entries 1014b point to pages 1016b.

An attribute indicator 1030 is included, in one embodiment, in entry 1006 of Region 3 table 1004 to indicate that a split in translation is to occur thereafter. In other embodiments, the indicator may be in other address translation structures including, but not limited to, the Region 2 table or the segment tables, as examples. Further, as described herein, in one or more embodiments, when table entries are replicated, not every physical page needs to be replicated.

In one embodiment, all segment directories are paired, increasing space usage. However, in another embodiment, only some processes, or address spaces contain a paired segment level, and pairing is selected by a control register, a special purpose register, an address space identifier or other register or indicator. Thus, this may be selected for processes subject to dynamic code optimization.

Figure 11:
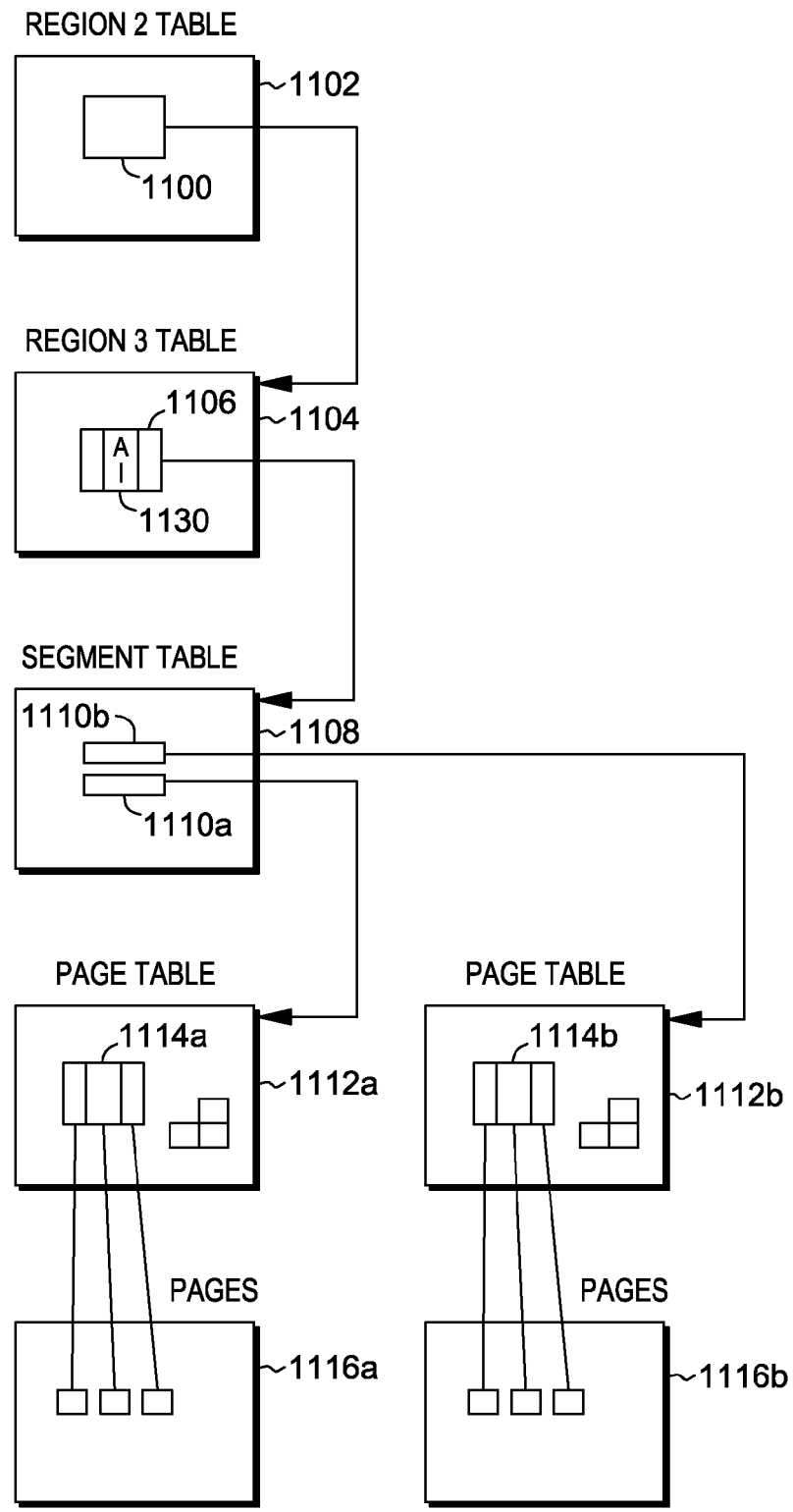
FIG. 11 depicts yet another example of a hierarchy of address translation structures having entries within a single segment table point to multiple page tables.

As an alternate embodiment, as shown in FIG. 11, the segment table entries are paired, requiring a larger segment table (e.g., 2×). Entries are interleaved with one another and each entry points to a different page table depending on the attribute (e.g., one for instruction fetches and another for data accesses). As shown in FIG. 11, an entry 1100 of a Region 2 table 1102 is used to indicate an origin of a Region 3 table 1104, and an entry 1106 in Region 3 table 1104 is used to indicate an origin of segment table 1108. An entry 1110a in segment table 1108 is used to indicate a page table 1112a, and an entry 1110b is used to indicate a page table 1112b, depending on the attribute. Entries 1114a in page table 1112a are used to locate pages 1116a, and entries 1114b in page table 1112b are used to locate pages 1116b.

An attribute indicator 1130 is included in entry 1106 of Region 3 table 1104. In other embodiments, it may be in other structures or indicated elsewhere.

In one embodiment, all segment directories contain paired entries; however, this increases space usage. Thus, in another embodiment, only some processes, or address spaces contain paired segment entries at the segment level, and pairing is selected by a control register, a special purpose register, an address space identifier or other register or indicator. Thus, this may be selected for processes subject to dynamic code optimization.

Although various address translation structures are described above with various formats, these are only examples. Many other formats are possible and considered a part of the claimed aspects. For instance, one or more of the region tables may be replicated or include paired entries. Other variations are also possible, including, but not limited to, having additional structures that may or may not be formatted as described in one or more of the embodiments herein. Further, other of the address translation structures may have entries with attribute indicators. Again, other possibilities exist.

As described herein, a path is taken through a hierarchy of address translation structures based on an attribute associated with the address to be translated. Although various attributes may be used, in this example, the attribute is either the address is being translated for an instruction fetch or for a data access. Based on the attribute, which may be implied by the unit of the computing unit requesting the translation (e.g., if the request is from an instruction fetch unit, the translation is assumed to be for an instruction fetch; and if the request is from a load/store unit, the translation is assumed to be for a data access), or explicitly indicated in the request, a path is taken through the hierarchy of address translation structures to obtain a translated address.

The address to be translated is, for instance, a virtual address and the translated address is a real or a physical address; however, in other embodiments, different types of addresses can be translated to different types of translated addresses.

Figure 12:
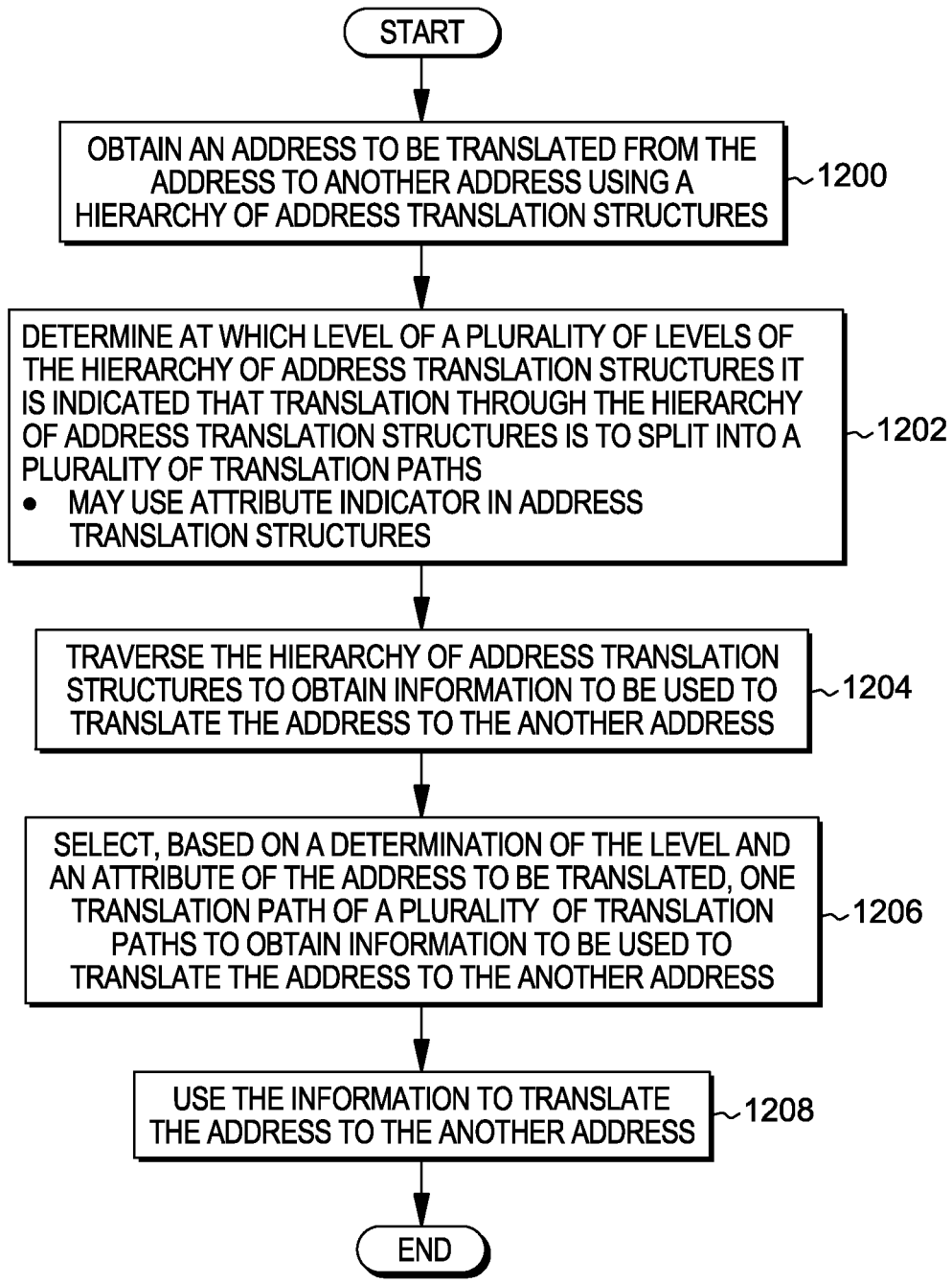
FIG. 12 depicts one embodiment of the logic to translate an address to another address.

One embodiment of the logic associated with translating an address from one address to another address using one or more aspects of the address translation capability described herein is described with reference to FIG. 12. Referring to FIG. 12, initially, a processor (e.g., a memory management unit of the processor) obtains (receives, is provided, or otherwise gets) an address to be translated, STEP 1200. In one example, the address is received in a request sent from a unit of the computing environment. For instance, an instruction fetch unit may send a request to the MMU requesting that an address be translated for an instruction fetch, or a load/store unit may send a request to the MMU to translate an address for a data access. In one embodiment, the translation is performed using a hierarchy of address translation instructions.

Based on receiving the address to be translated to another address, the processor determines at which level of a plurality of levels of the hierarchy of address translation structures it is indicated that translation through the hierarchy of address translation instructions is to split into a plurality of translation paths, STEP 1202. In one example, this is determined by an attribute indicator in one or more of the address translation structures. In other embodiments, this is indicated by configuration, or by a value in a register, such as a control register or other type of register. Other types of indications may also be used.

The processor begins traversing the hierarchy of address translation structures to obtain information to be used to translate the address to the another address, STEP 1204. Based on a determination of the level to split and an attribute of the address to be translated, one translation path of a plurality of translation paths is selected to obtain information to be used to translate the address to the another address, STEP 1206. The information that is obtained is then used to translate the address to the another address, STEP 1208.

Figure 13:
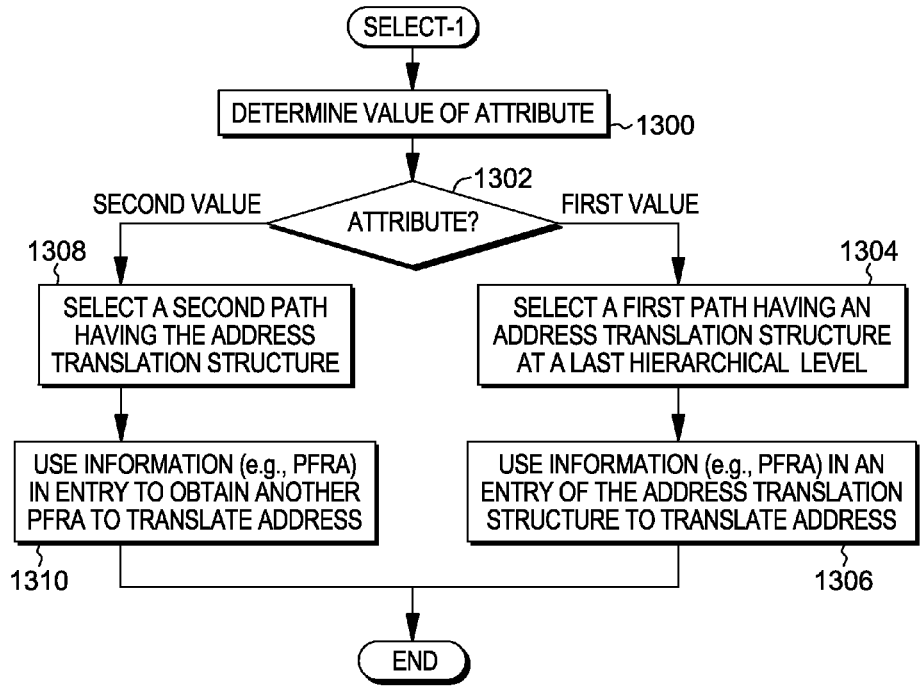
FIG. 13 depicts one embodiment of the logic to select a path of a plurality of translation paths.

One embodiment of selecting a translation path, after the split is indicated, is described with reference to FIG. 13. In this particular example, a determination is made as to the value of the attribute associated with the address to be translated, STEP 1300. If the attribute is a first value, INQUIRY 1302, then a first path is selected. The first path has an address translation structure at a last hierarchical level (e.g., a page table). Information in an entry of this address translation structure is used to translate the address, STEP 1306. For instance, an origin within an entry of a segment table coupled to the page table is used to locate the page table, and then PX of the virtual address is used to locate a page table entry. A page frame real address obtained from the page table entry is concatenated with an offset of the virtual address to provide a real address, which is the translated address.

Returning to INQUIRY 1302, if the attribute is a second value, then a second path is selected, STEP 1308. This second path also has the address translation structure, however, information in an entry of the address translation structure is used to obtain further information to translate the address, STEP 1310. For instance, when the attribute is a second value (e.g., data access), the processor (e.g., MMU) is configured such that the page frame real address in the page table entry is not used directly to obtain the real address, but instead, is used to obtain another page frame real address, and that other page frame real address is used to translate the address. As described herein, the page addressed by the other page frame real address is at a defined offset from the page addressed by the page frame real address in the entry, and thus, different equations may be used in order to determine the other page frame real address, depending on the offset.

Figure 14:
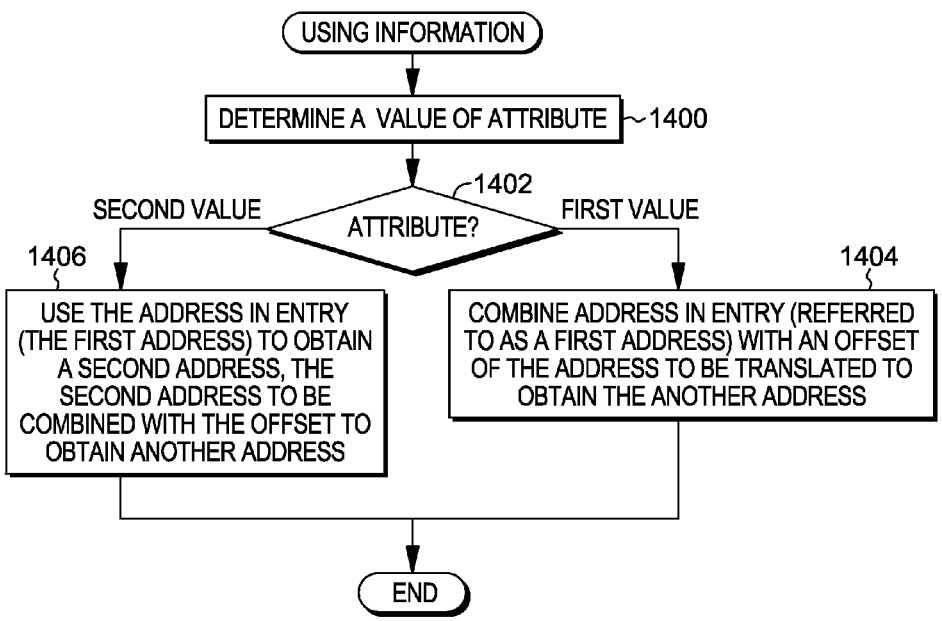
FIG. 14 depicts one embodiment of the logic to use information obtained from an address translation structure to translate the address to the another address.

For the above embodiment, further details relating to using the information to obtain the translated address are described with reference to FIG. 14. Referring to FIG. 14, initially a determination is made as to a value of the attribute, STEP 1400. If the attribute is a first value, INQUIRY 1402, then the page frame real address in the page table entry is used to translate the address to the another address (e.g., page frame real address is concatenated with an offset of the virtual address to provide the another address), STEP 1404.

Returning to INQUIRY 1402, if the attribute is a second value, then the page frame real address in the entry is used to obtain a second address, STEP 1406. The second address, which is also a page frame real address, is used to translate the address to the another address (e.g., the second page frame real address is concatenated with an offset of the virtual address to provide the another address).

Figure 15:
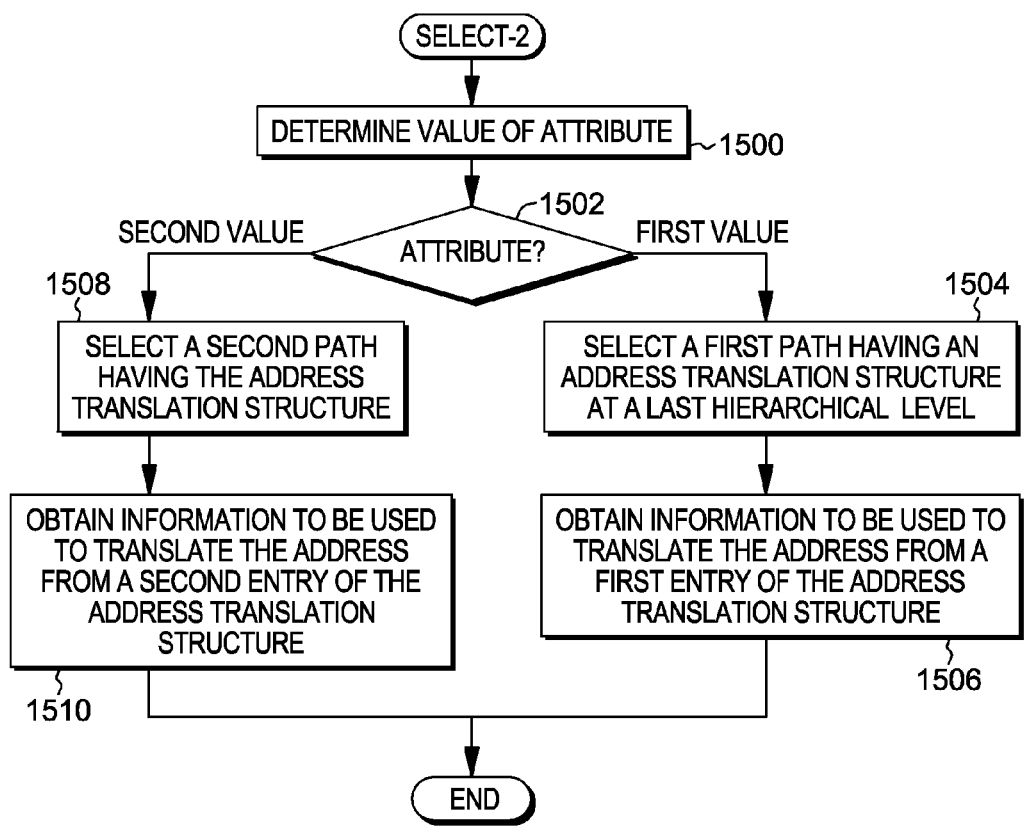
FIG. 15 depicts another embodiment of the logic to select a path of a plurality of translation paths.

Another example of selecting a translation path after the split is indicated is described with reference to FIG. 15. Referring to FIG. 15, initially a value of the attribute is determined, STEP 1500. If the attribute is a first value, INQUIRY 1502, then a first path is selected, STEP 1504. The first path has an address translation structure at a last hierarchal level (e.g., a page table). Information to be used to translate the address (e.g., PFRA) is obtained from an entry of the address translation structure, STEP 1506.

Returning to INQUIRY 1502, if the attribute is a second value, then a second path is selected, STEP 1508. In this example, the second path has the same address translation structure, but information to be used to translate the address (e.g., PFRA) is obtained from a different entry of that address translation structure, STEP 1510. For instance, if the attribute is a second value (e.g., data access), the processor (e.g., MMU) is configured to not use the page table entry pointed to, but to use another page table entry, which is paired with that entry (e.g., at a predefined offset, etc.).

That is, in one embodiment, the processor (e.g., the MMU) is configured such that if the attribute is a first value (e.g., instruction fetch), then the page table entry located by the origin in a segment table entry concatenated with PX of the virtual address is the page table entry to be used for translation. However, if the attribute is a second value, then the origin in the segment table entry concatenated with PX plus an offset (as an example) is used to obtain the page table entry paired with the first page table entry and that is the entry used for translation. Information, such as the PRFA, is obtained from that paired page table entry and used to obtain the translated address, when the attribute is the second value.

Figure 16:
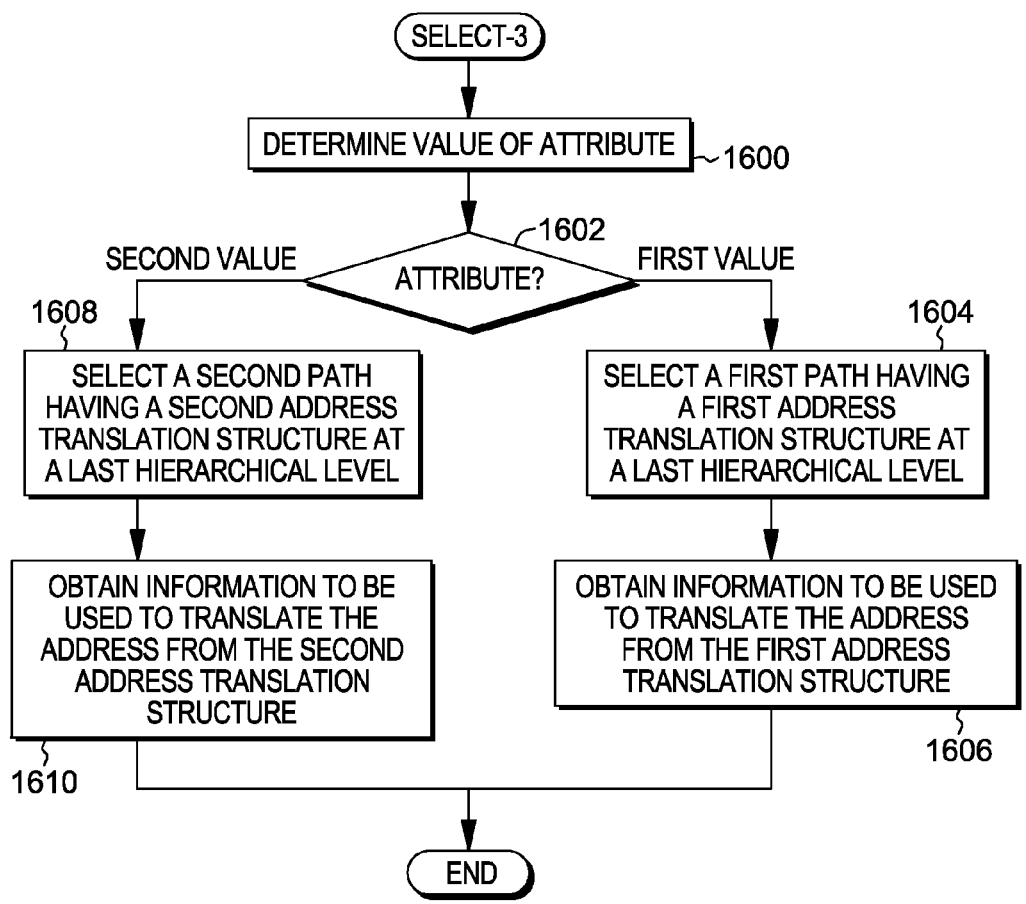
FIG. 16 depicts yet another embodiment of the logic to select a path of a plurality of translation paths.

A yet another embodiment of selecting a translation path after the split is indicated is described with reference to FIG. 16. In this example, a value of the attribute is determined, STEP 1600, and if the attribute is a first value, STEP 1602, then a first path is selected, STEP 1604. This first path has a first address translation structure at a last hierarchical level (e.g., a page table). Information to be used to translate the address is obtained from this first address translation structure, STEP 1606. For instance, the processor (e.g., MMU) is configured to select, based on the attribute being a first value (e.g., instruction fetch), the instruction page table. Thus, an origin in an entry of the segment table coupled to the page table is used to locate the instruction page table, and then PX of the virtual address is used to locate an entry within the instruction page table to be used for translation.

Returning to INQUIRY 1602, if the attribute is a second value, then a second path is selected, STEP 1608. This second path has a second address translation structure at a last hierarchical level (e.g., another page table), and information to be used to translate the address is then obtained from this second address translation structure, STEP 1610. For instance, when the attribute is a second value (e.g., data access), the processor (e.g., MMU) is configured to select, e.g., the data page table, and thus, it determines an origin of the data page table by adding, e.g., an offset to the origin of the instruction page table. An entry is then selected in the data page table using the PX field of the virtual address. Information is then obtained from that entry for translation.

Although various embodiments of selecting a translation path from a plurality of translation paths are described above, other embodiments may be provided without departing from one or more aspects of the capabilities described herein. For instance, an address translation structure at any level of the hierarchy may be structured as described herein (e.g., one address translation structure having separate translation entries for different attributes; separate address translation structures for each attribute; with or without an attribute indicator, etc.). The embodiments described herein are just examples.

In one or more embodiments, the information that is obtained to translate the address is a page frame real address which is concatenated with an offset of the virtual address to provide the translated address. In other embodiments, however, other information may be used, and/or other types of addresses may be translated.

As described herein, in one embodiment, one address (e.g., a virtual address) is translated to another address (e.g., a real address) using a hierarchy of translation tables, wherein a path through the hierarchy of translation tables is selected based on an attribute of the address to be translated (e.g., translation for an instruction fetch or a data access). Thus, in one embodiment, a virtual address of an instruction may obtain a page table entry that is different than the same virtual address of a data operand.

In accordance with one or more aspects, two different pages are maintained at the same address to be translated: a data page containing the original, unmodified code and used to satisfy, load and store instructions to provide correct self-referential execution; and an instruction page containing the modified code that can contain callouts to optimized functions, or replace functions in-place for optimized kernels. Replace functions in place works, e.g., when it has been determined that no local branch targets are possible for modified code. Call-out works without such analysis.

In one particular embodiment, pages in the translation tables can have separate translation entries for instruction fetches and data accesses, while in another embodiment, separate address translation structures are used for instruction fetches or data accesses.

In one or more embodiments, sharing can occur at sub-levels of either the actual pages or entire directories.

As described herein, in one or more embodiments, a page table is extended to support separate I (instruction) and D (data) translations. Advantageously, DAT translation is extended to locate separate translations for I and D accesses. In one aspect, I and D pages are paired. Pairing is accomplished by, e.g., using consecutive pages, or by storing I and D pages with a defined offset, as examples. In one embodiment, the offset is a constant defined at design time. In another embodiment, it is a constant obtained from a register, such as a control register, a special purpose register, a scan register, or other type or register, or from configuration information. In one embodiment, the definition applies to all partitions in a system, to a partition, and/or to a VM guest.

In another aspect, separate translation pages within a translation table are for providing separate and independent translations for I and D accesses, where separate entries are provided for I and D accesses. In one embodiment, the separate I and D translations are obtained from separate (leaf) translation pages. In one embodiment, all leaf pages are duplicated for I and D. In another embodiment, only those that are indicated by a flag are duplicated. In one embodiment, the duplicated pages are paired in a variety of ways, as described herein. In at least one embodiment, leaf translation pages only use half a physical memory page, and I and D translations are stored consecutively within a page. Other examples are also possible.

In another embodiment, portions of the tree are also replicated. At least one interior node is duplicated to provide an interior node for I and D translations. In other embodiments, I and D entries are interspersed in lieu of pairing, requiring larger translation units.

In one embodiment, separate pages provide increased locality because a first set of pages are commonly used by I references, and another set by D references. In another embodiment, interspersed translations simplify coalescing of I and D translations when they are not separate. Many other variations exist.

Figure 17:
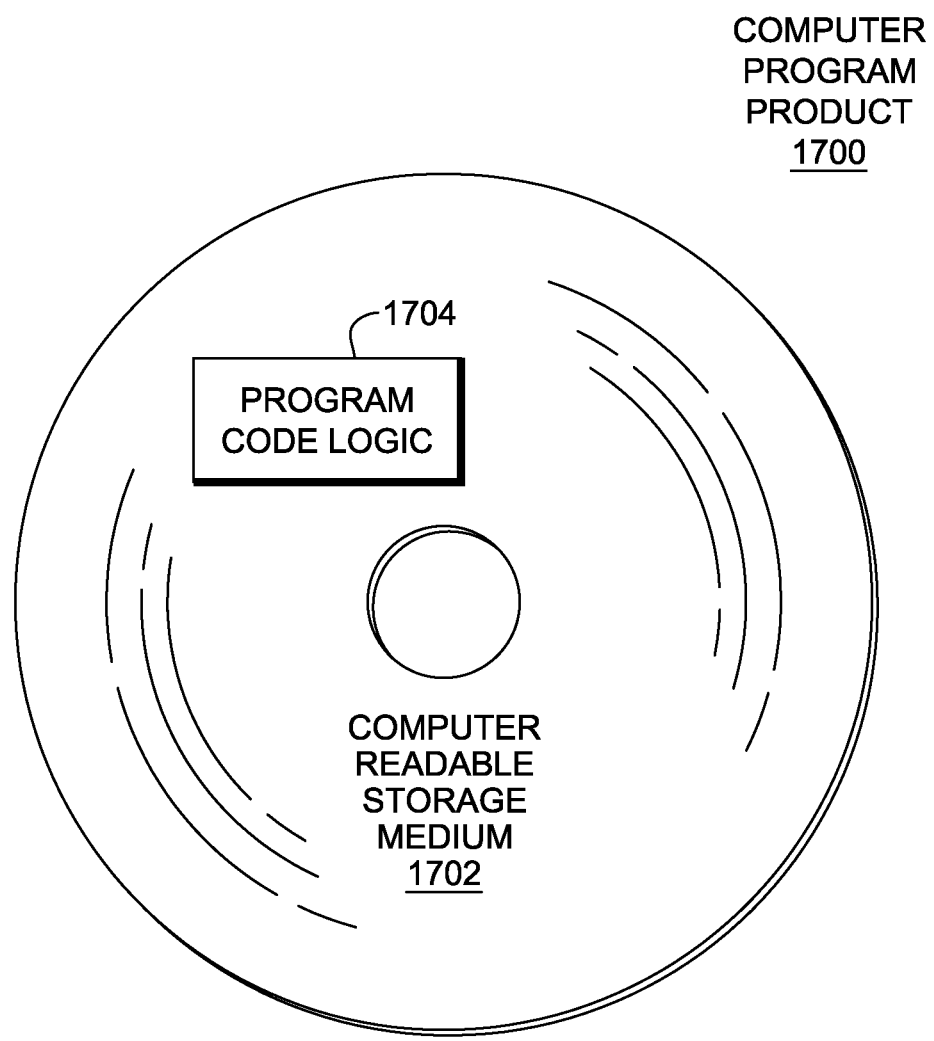
FIG. 17 depicts one embodiment of a computer program product.

Referring to FIG. 17, in one example, a computer program product 1700 includes, for instance, one or more non-transitory computer readable storage media 1702 to store computer readable program code means, logic and/or instructions 1704 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, other types of address translation may benefit from one or more aspects. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 18:
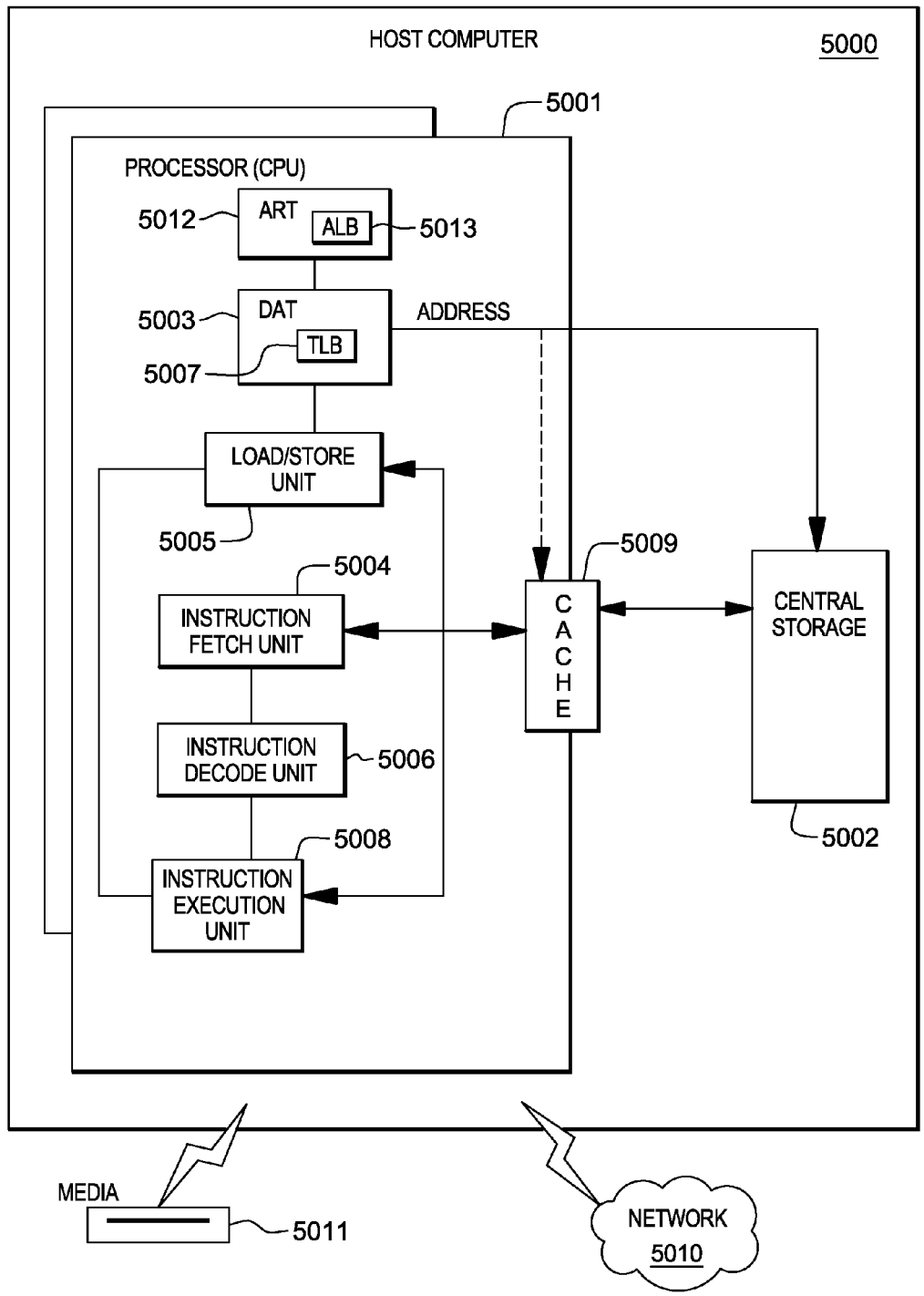
FIG. 18 depicts one embodiment of a host computer system.

Referring to FIG. 18, representative components of a Host Computer system 5000 to implement one or more embodiments are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have access register translation (ART) 5012, which includes an ART lookaside buffer (ALB) 5013, for selecting an address space to be used by dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses.

In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. In another embodiment, this information may be obtained from firmware, e.g., in accordance with interfaces specified by the Power Architecture Platform Reference specification. A model may also provide one or more of data cache block touch (dcbt), PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the POWER ISA and z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the POWER ISA and z/Architecture, bits are numbered in a left-to-right sequence. In the POWER ISA and z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. In one example, bits 8-31 and 1-31 apply to addresses that are in a location (e.g., register) that is 32 bits wide, whereas bits 40-63 and 33-63 apply to addresses that are in a 64-bit wide location. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, 16, and 32 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. An octoword is a group of 32 consecutive bytes on a 32-byte boundary. When storage addresses designate halfwords, words, doublewords, quadwords, and octowords, the binary representation of the address contains one, two, three, four, or five rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one example, the embodiment may be practiced by software (sometimes referred to licensed internal code, firmware, micro-code, milli-code, pico-code and the like, any of which would be consistent with one or more embodiments). Referring to FIG. 18, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 19:
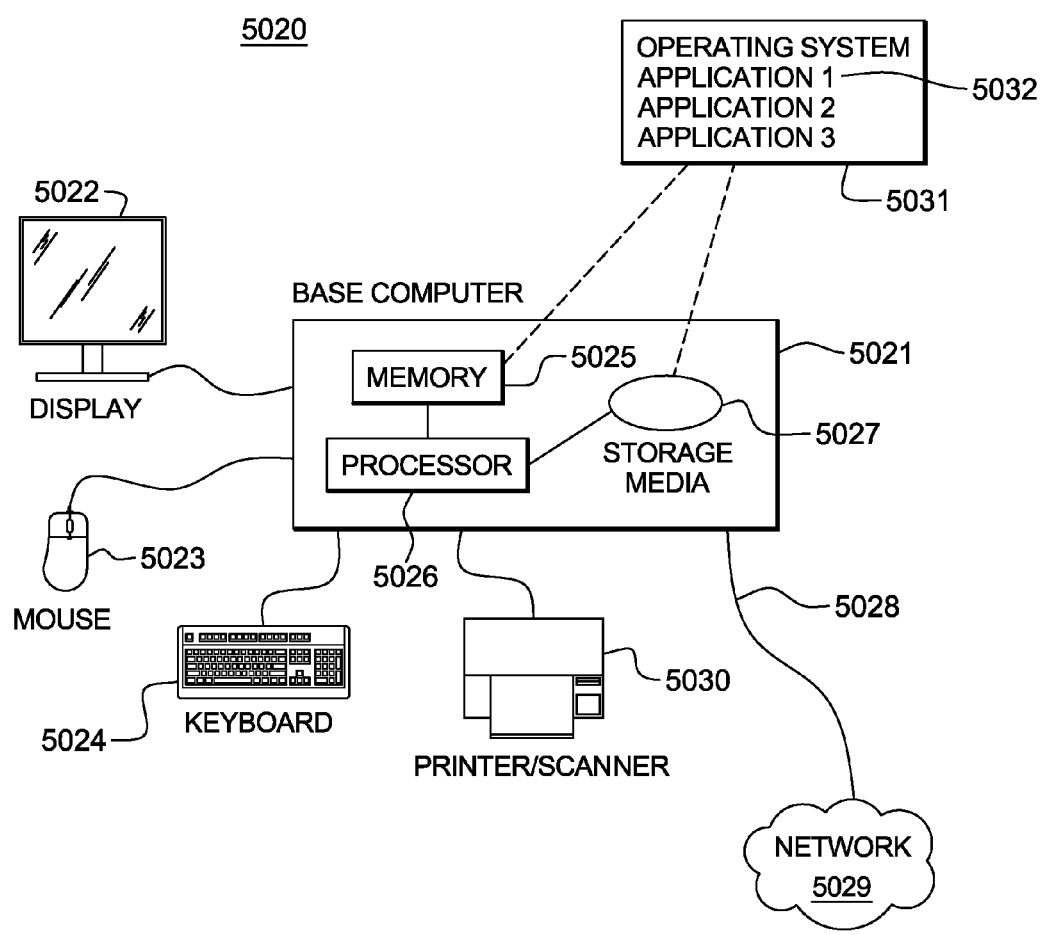
FIG. 19 depicts a further example of a computer system.

FIG. 19 illustrates a representative workstation or server hardware system in which one or more embodiments may be practiced. The system 5020 of FIG. 19 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 20:
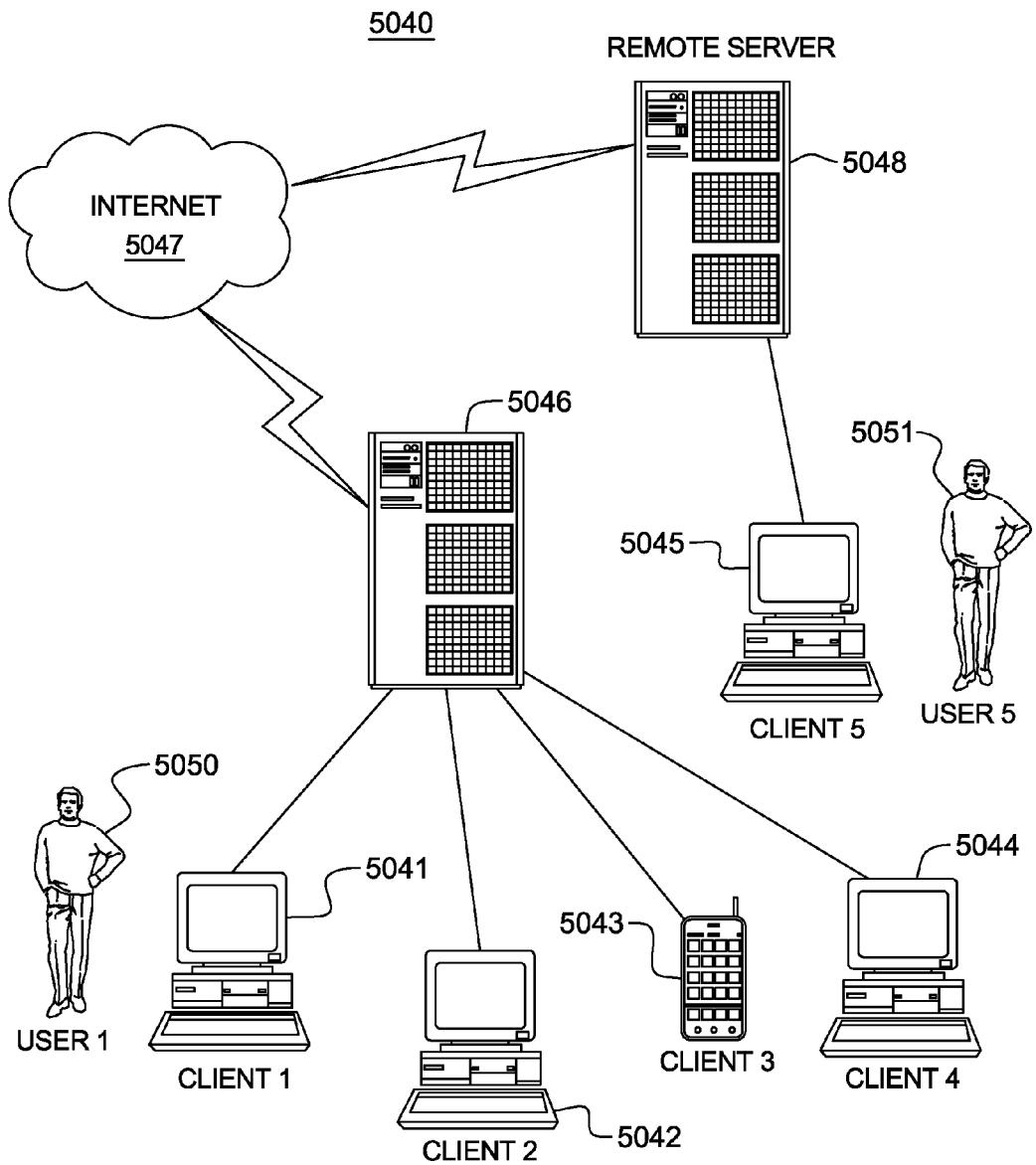
FIG. 20 depicts another example of a computer system comprising a computer network.

FIG. 20 illustrates a data processing network 5040 in which one or more embodiments may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 20, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing one of an IBM Power Systems server and an IBM System z server available from International Business Machines Corporation.

Referring concurrently to FIG. 19 and FIG. 20, software programming code 5031 which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 21:
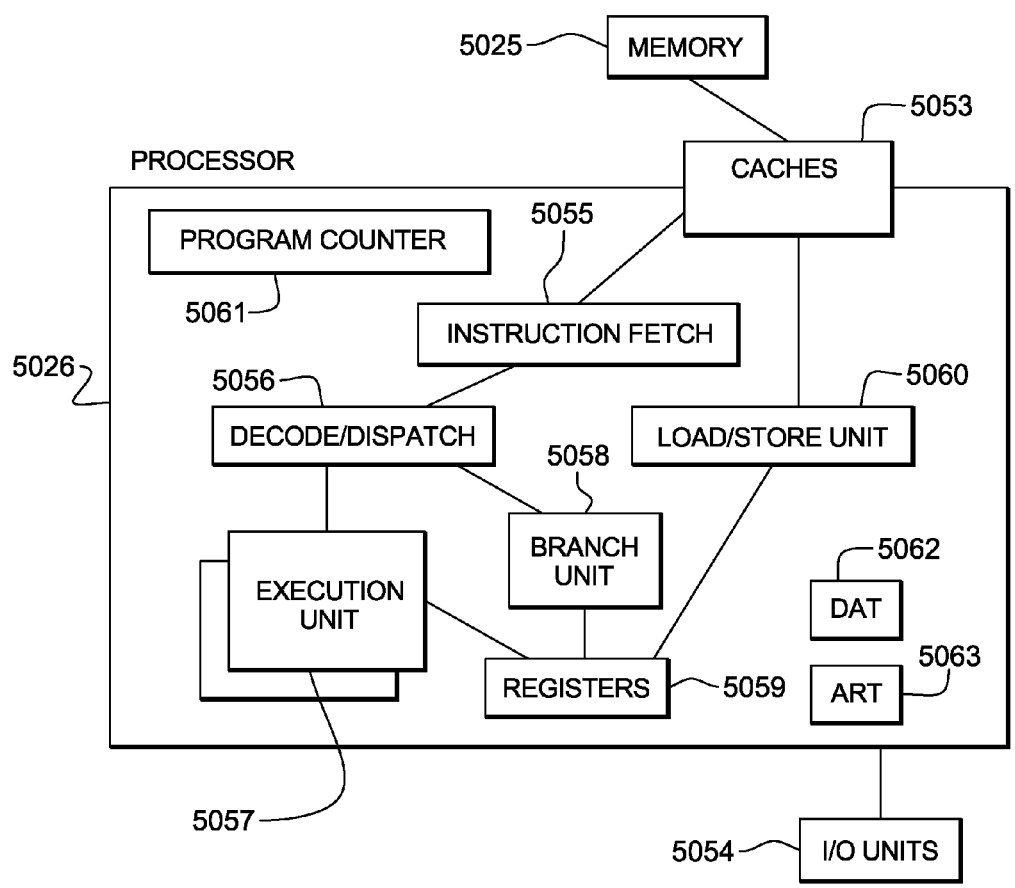
FIG. 21 depicts one embodiment of various elements of a computer system.

Referring to FIG. 21, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter in a Power Architecture processor is 64 bits and can be truncated to 32 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. Instructions of the IBM Power ISA are RISC instructions having a length of 4 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Virtual addresses are transformed into real addresses using dynamic address translation 5062 and, optionally, using access register translation 5063.

Figure 22A:
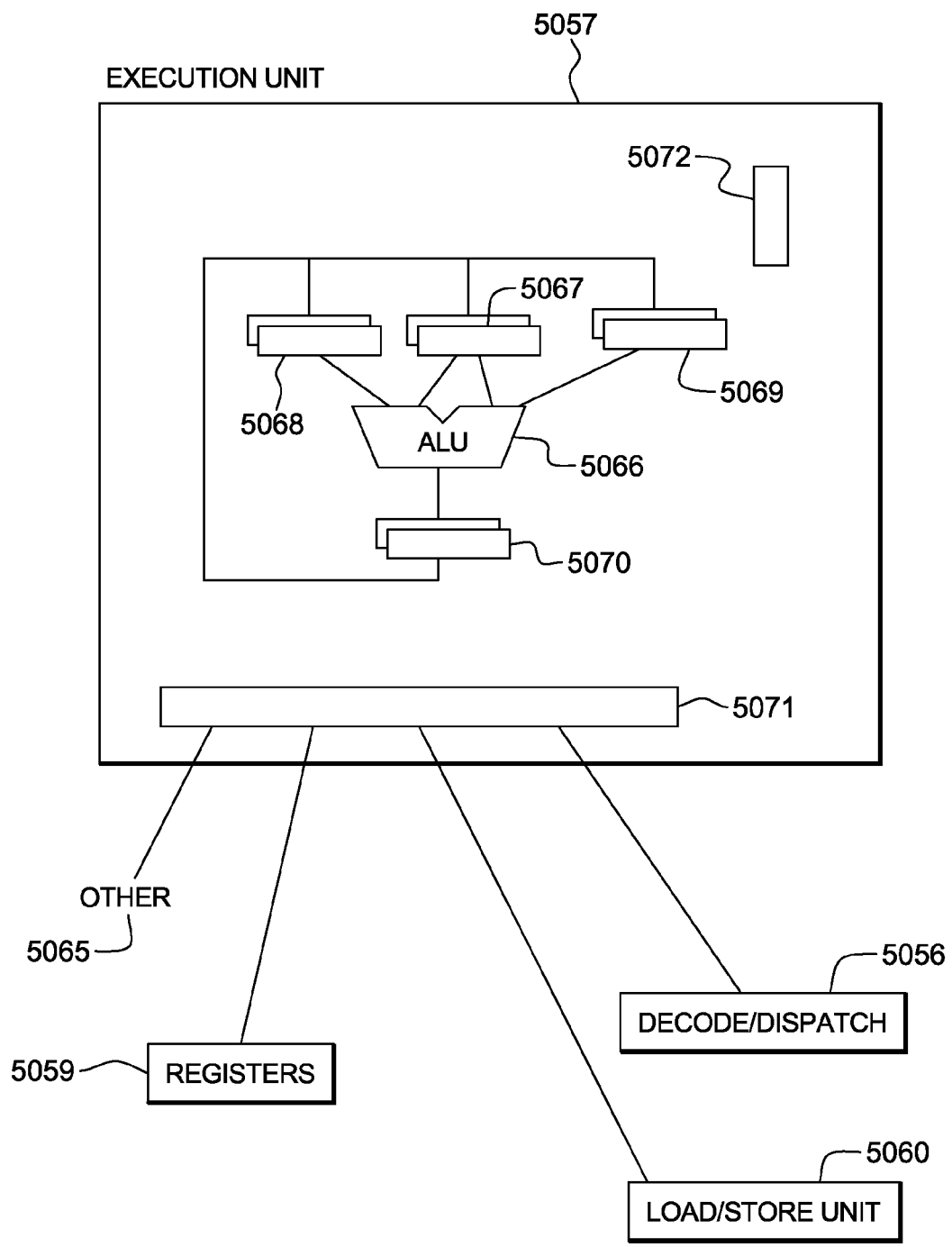
FIG. 22A depicts one embodiment of the execution unit of the computer system of FIG. 21.

A processor 5026 typically has one or more units 5057, 5058, 5060 for executing the function of the instruction. Referring to FIG. 22A, an execution unit 5057 may communicate 5071 with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. The IBM Power ISA supports both Big Endian and Little Endian execution modes. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 22B:
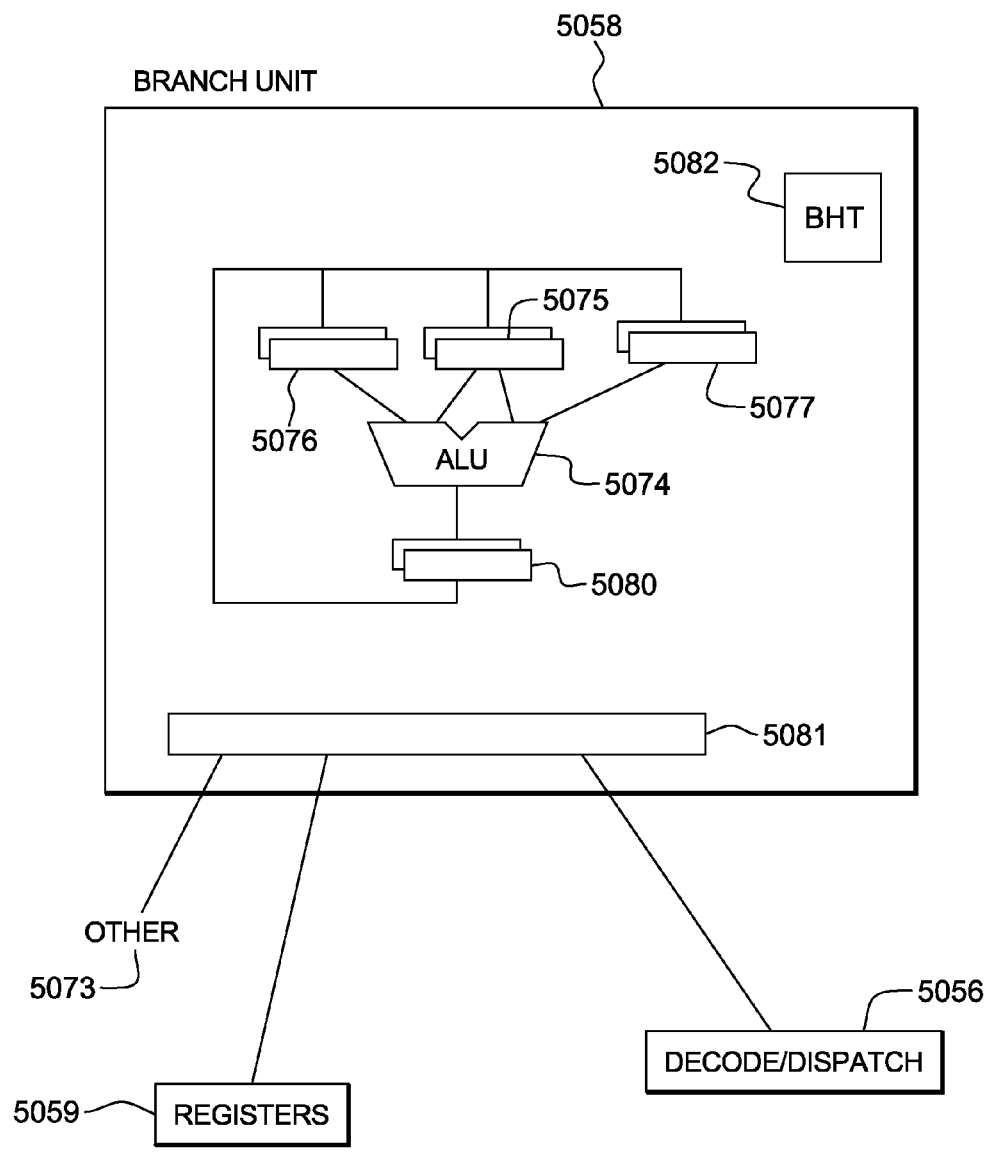
FIG. 22B depicts one embodiment of the branch unit of the computer system of FIG. 21.

Referring to FIG. 22B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate 5081 with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example; or the Power ISA addressing modes wherein D-Form addresses define a base register and an immediate field (displacement field) that are added together to provide the address of the operand in memory; and wherein X-Form addresses define a base register and an index register that are added together to provide the address of the operand in memory. Location herein typically implies a location in main memory (main storage) unless otherwise indicated.

Figure 22C:
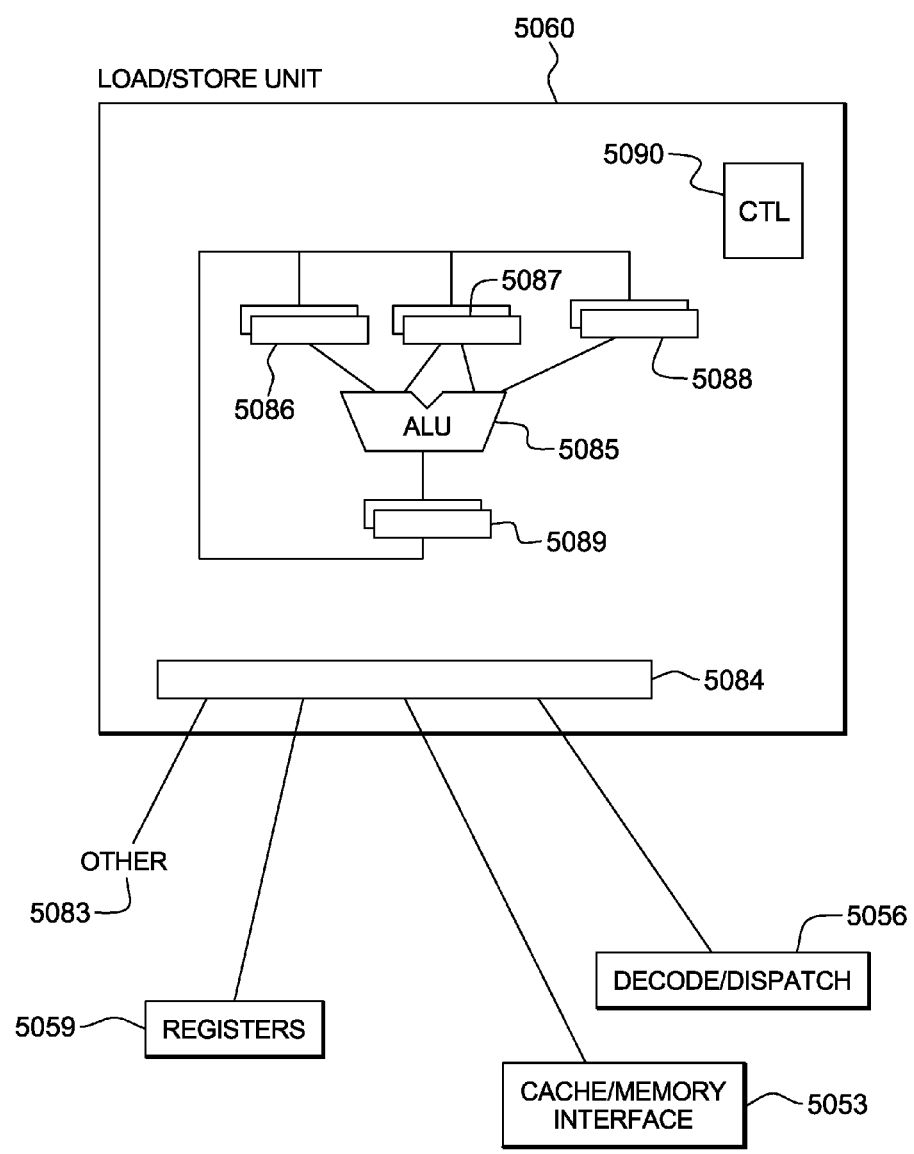
FIG. 22C depicts one embodiment of the load/store unit of the computer system of FIG. 21.

Referring to FIG. 22C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate 5084 with general registers 5059, decode/dispatch unit 5056, cache/memory interface 5053 or other elements 5083 and comprises various register circuits 5086, 5087, 5088 and 5089, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 21) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices. In RISC servers, such as Power Systems from IBM®, proprietary adapters and open system adapters are I/O units that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a Power Systems or a z/Architecture IBM® Server, or alternatively in machines executing other architectures. They can be emulated in the existing and in future IBM® mainframe servers, Power Systems servers and on other machines of IBM® (e.g., System x Servers). They can be executed in machines running Linux on a wide variety of machines using hardware manufactured by IBM®, Intel®, AMD, and others. Besides execution on that hardware under a Power Architecture or z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 23:
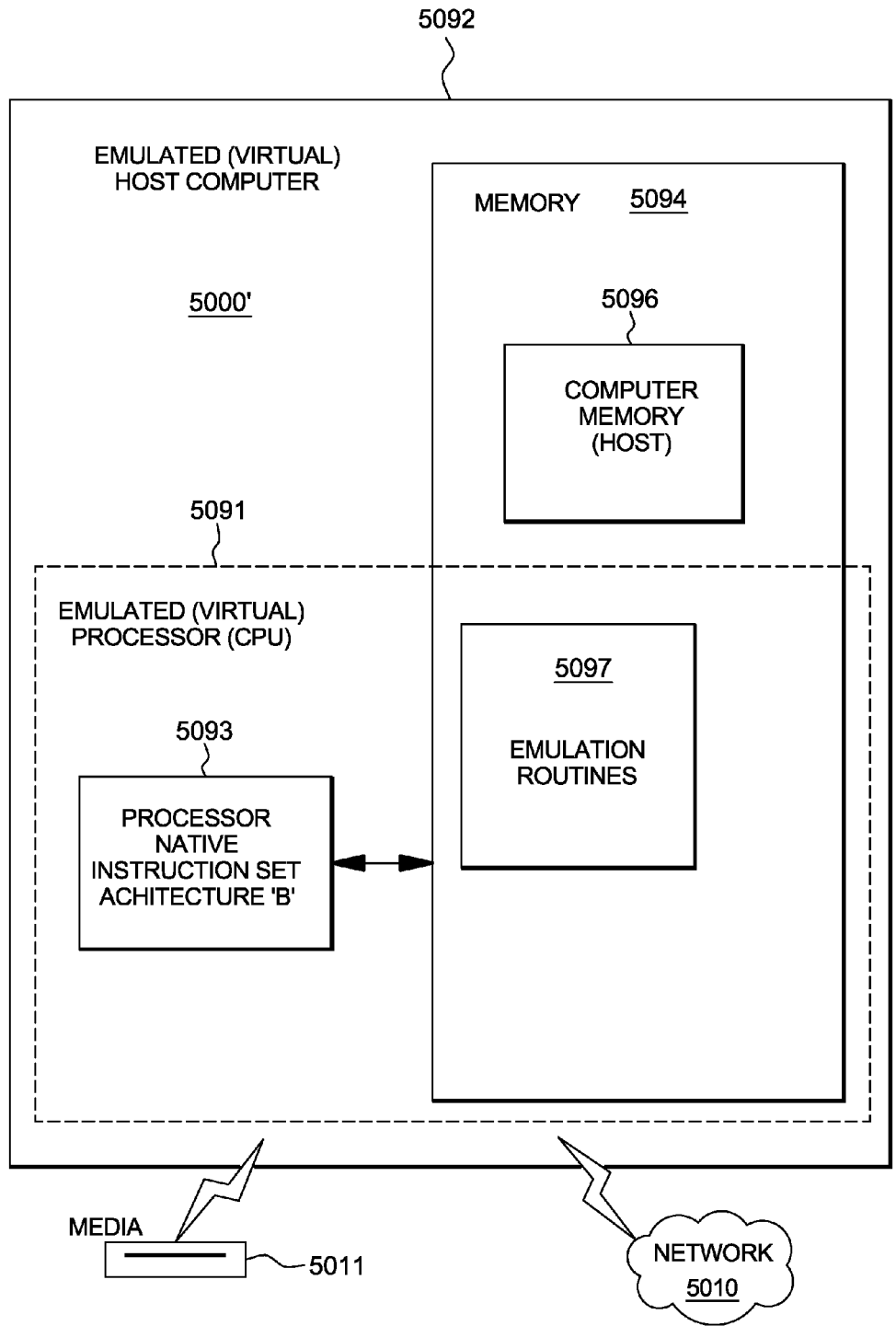
FIG. 23 depicts one embodiment of an emulated host computer system.

In FIG. 23, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 24:
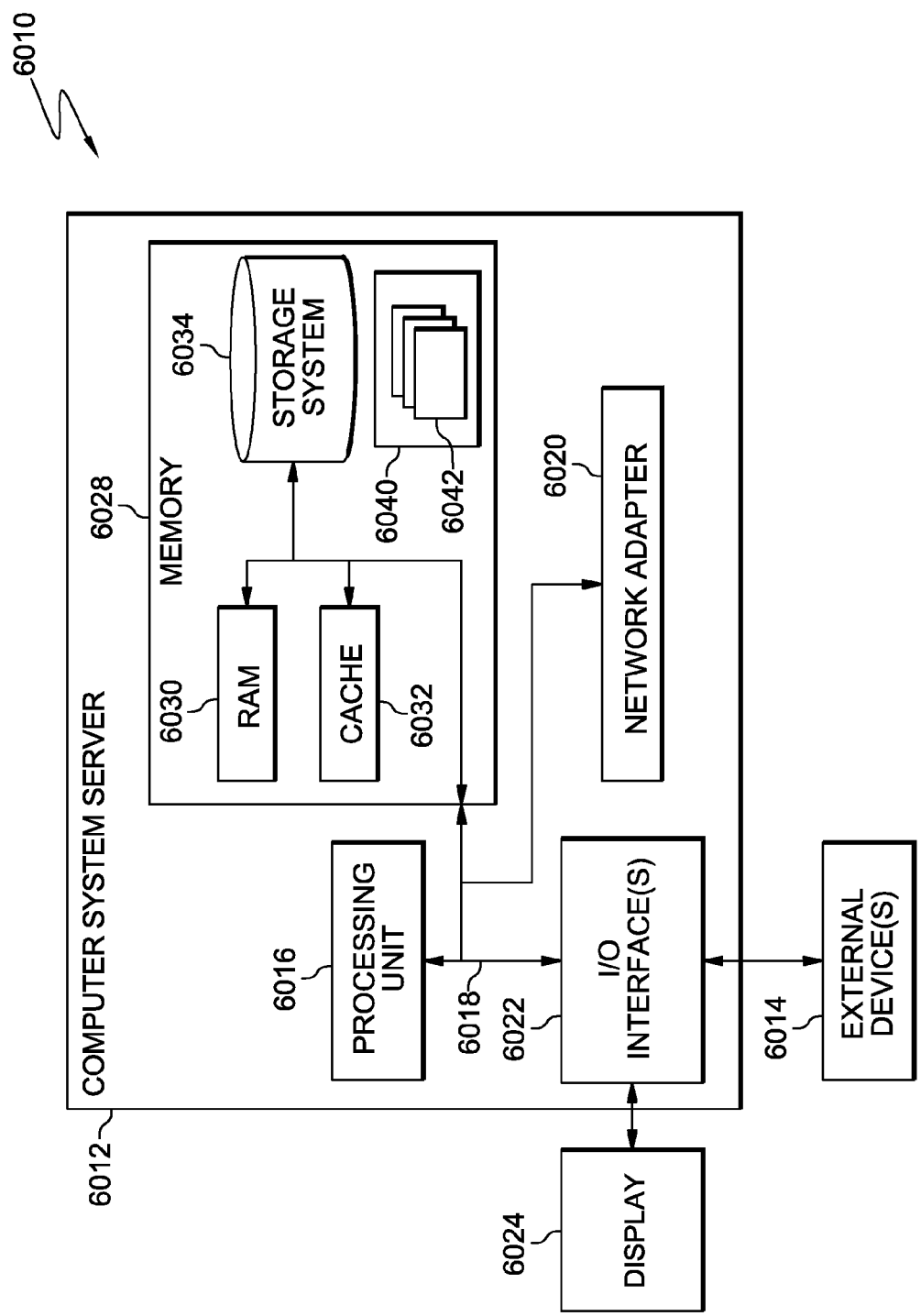
FIG. 24 depicts one embodiment of a cloud computing node.

Referring now to FIG. 24, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 24, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 25:
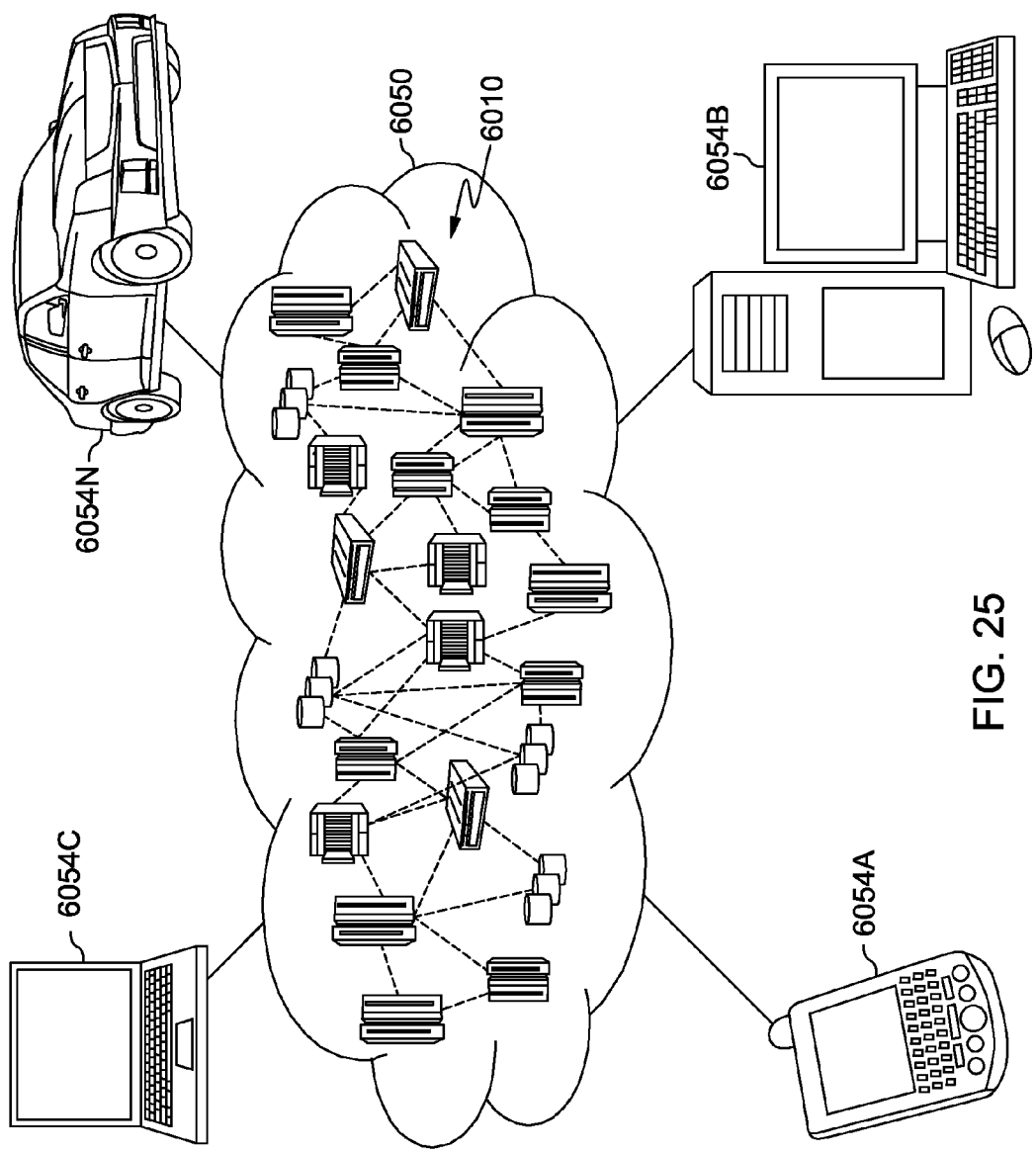
FIG. 25 depicts on embodiment of a cloud computing environment.

Referring now to FIG. 25, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 25 are intended to be illustrative only and that computing nodes 6010 and cloud computing environment 6050 can communicate with any type of computerized device over any type of network and/or network addressable connection (e.g., using a web browser).

Figure 26:
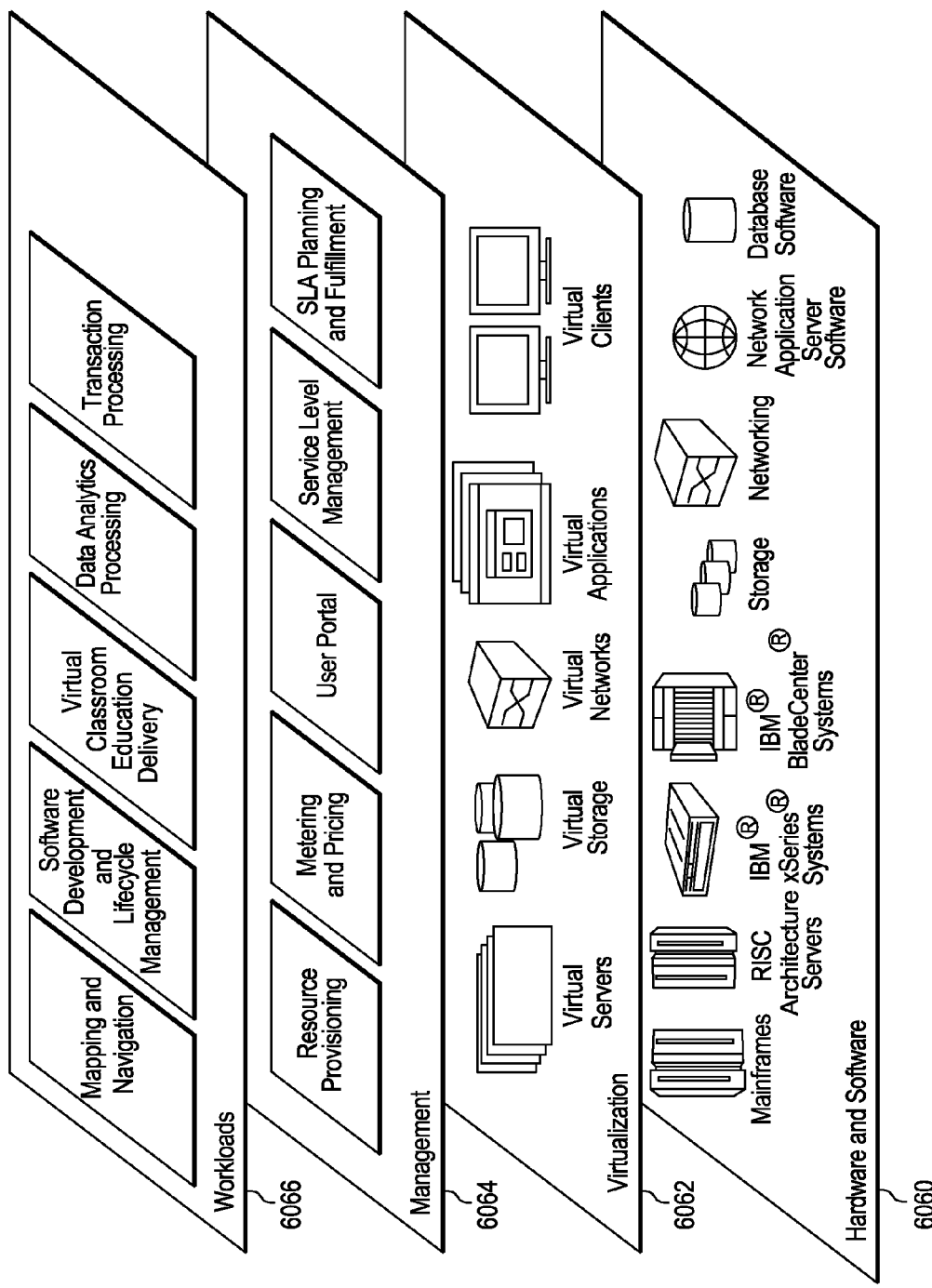
FIG. 26 depicts one example of abstraction model layers.

Referring now to FIG. 26, a set of functional abstraction layers provided by cloud computing environment 6050 (FIG. 25) is shown. It should be understood in advance that the components, layers, and functions shown in FIG. 26 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of facilitating address translation in a computing environment, said method comprising:

obtaining an address to be translated from the address to another address using a hierarchy of address translation structures, the hierarchy of address translation structures comprising a plurality of levels;

determining, based on an indicator in an address translations structure of the hierarchy of address translation structures, that at a last level of the plurality of levels that translation through the hierarchy of address translation structures is split into a plurality of translation paths, wherein the plurality of levels comprises 1 to n levels and n is the last level in the hierarchy of the address translation structures, wherein n is an integer greater than or equal to 2, and wherein the indicator is in the address translation structure at the last level of the plurality of levels;

traversing the hierarchy of address translation structures to obtain information to be used to translate the address to the another address, wherein the traversing comprises selecting, based on the determining and based on an attribute of the address to be translated, one translation path of the plurality of translation paths from which to obtain the information to be used to translate the address to the another address, wherein the another address is different for each path, wherein the selecting further comprises:

selecting, based on the attribute being an instruction fetch, one translation path of the plurality of translation paths comprising a first address translation structure, the one translation path to use a first address in an entry of an address translation structure at the last level to translate the address to the another address; and selecting, based on the attribute being a data access, another translation path of the plurality of translation paths comprising a second address translation structure, the another translation path to use the first address in the entry to obtain a second address to be used to translate the address to another address, the traversing selecting the one path or the another path based on the attribute; and using the information to translate the address to the another address.

2. The method of claim 1, wherein the one translation path comprises a third address translation structure in a hierarchical relationship with the first address translation structure, the third address translation structure comprising an attribute indicator to indicate translation is to be split, and wherein the second address translation structure is at a defined offset from the first address translation structure.

3. The method of claim 1, wherein the one translation path comprises a third address translation structure in a hierarchical relationship with the first address translation structure, and the another translation path comprises a fourth address translation structure at a same level as the third address translation structure in a hierarchical relationship with the second address translation structure.

4. The method of claim 3, wherein an attribute indicator to indicate translation is to split is located in another address translation structure that points to the third address translation structure.

5. The method of claim 1, wherein one translation path comprises a third translation structure having one entry to point to the first address translation structure, and the another translation path comprises the third translation structure having another entry to point to the second address translation structure.

* * * * *